(12) United States Patent
Miyahara et al.

(10) Patent No.: US 11,173,926 B2
(45) Date of Patent: Nov. 16, 2021

(54) OPERATION AUTHORITY MANAGEMENT APPARATUS AND OPERATION AUTHORITY MANAGEMENT METHOD

(71) Applicant: MITSUBISHI ELECTRIC CORPORATION, Tokyo (JP)

(72) Inventors: Tadashi Miyahara, Tokyo (JP); Mitsuo Shimotani, Tokyo (JP); Naohiko Obata, Tokyo (JP); Yoshitaka Nakamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 394 days.

(21) Appl. No.: 16/305,498

(22) PCT Filed: Aug. 5, 2016

(86) PCT No.: PCT/JP2016/073163
§ 371 (c)(1),
(2) Date: Nov. 29, 2018

(87) PCT Pub. No.: WO2018/025414
PCT Pub. Date: Feb. 8, 2018

(65) Prior Publication Data
US 2020/0231181 A1 Jul. 23, 2020

(51) Int. Cl.
*B60W 60/00* (2020.01)
*B60W 50/12* (2012.01)
*B60W 50/14* (2020.01)

(52) U.S. Cl.
CPC ........ *B60W 60/0053* (2020.02); *B60W 50/12* (2013.01); *B60W 50/14* (2013.01); *B60W 60/0051* (2020.02); *B60W 60/0059* (2020.02)

(58) Field of Classification Search
CPC .. B60W 50/12; B60W 50/14; B60W 60/0053; B60W 60/0059; B60W 60/0051
(Continued)

(56) References Cited

U.S. PATENT DOCUMENTS 10,747,220 B2 * 8/2020 Uchida ................ G05D 1/0088
2015/0353088 A1 12/2015 Ishikawa
(Continued)

FOREIGN PATENT DOCUMENTS

JP 9-86223 A 3/1997
JP 2015-24746 A 2/2015
(Continued)

OTHER PUBLICATIONS

Office Action issued in corresponding Japanese Application No. 2018-531722 dated Jul. 9, 2019, with English translation.
(Continued)

*Primary Examiner* — Peter D Nolan
*Assistant Examiner* — Luke Huynh
(74) *Attorney, Agent, or Firm* — Birch, Stewart, Kolasch & Birch, LLP.

(57) ABSTRACT

An operation authority management apparatus manages switching between automatic operation and manual operation of a plurality of actuators (a steering actuator, an accelerator actuator, and a brake actuator) of a subject vehicle. In the operation authority management apparatus, a subject vehicle behavior prediction unit predicts a behavior of the subject vehicle. A determination unit determines, for each individual actuator, whether or not to permit switching of the actuator during the automatic operation to the manual operation on the basis of the behavior of the subject vehicle predicted by the subject vehicle behavior prediction unit. A notification unit notifies a driver of the subject vehicle of a determination result made by the determination unit.

20 Claims, 15 Drawing Sheets

| | | PREDICTED VALUE OF THE AMOUNT OF VARIATION IN TRAVEL SPEED | |
|---|---|---|---|
| | | LARGE | SMALL |
| PREDICTED VALUE OF THE AMOUNT OF VARIATION IN STEERING ANGLE | LARGE | SWITCHING TO MANUAL OPERATIONS OF ACCELERATOR, BRAKE, AND STEERING IS PROHIBITED | SWITCHING TO MANUAL OPERATIONS OF ONLY ACCELERATOR AND BRAKE IS PERMITTED |
| | SMALL | SWITCHING TO MANUAL OPERATION OF ONLY STEERING IS PERMITTED | SWITCHING TO MANUAL OPERATIONS OF ACCELERATOR, BRAKE, AND STEERING IS PERMITTED |

(58) Field of Classification Search
USPC .......................................................... 701/27
See application file for complete search history.

(56) References Cited

U.S. PATENT DOCUMENTS

2016/0207537 A1\* 7/2016 Urano ................... B60W 50/16
2019/0061745 A1\* 2/2019 Hatano ................. B60W 20/15

FOREIGN PATENT DOCUMENTS

| JP | 2015-87268 A  | 5/2015  |
| JP | 2015-182525 A | 10/2015 |
| JP | 2015-230573 A | 12/2015 |
| JP | 2016-97770 A  | 5/2016  |
| JP | 2016-133984 A | 7/2016  |

OTHER PUBLICATIONS

International Search Report for PCT/JP2016/073163 dated Oct. 25, 2016.
Office Action issued in corresponding Chinese Application No. 201680087402.7 dated May 11, 2021 with an English Translation.

\* cited by examiner

F I G . 1
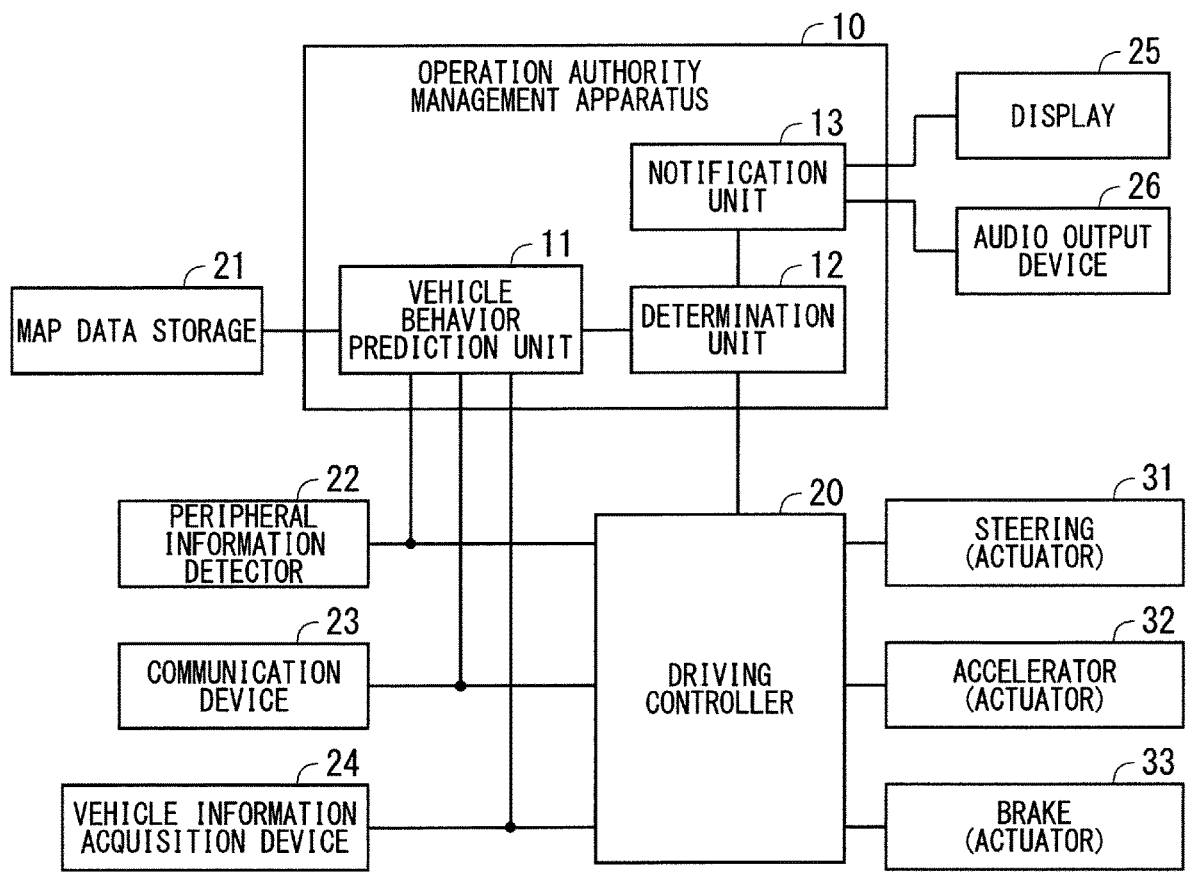

F I G. 2

| | | PREDICTED VALUE OF THE AMOUNT OF VARIATION IN TRAVEL SPEED | |
|---|---|---|---|
| | | LARGE | SMALL |
| PREDICTED VALUE OF THE AMOUNT OF VARIATION IN STEERING ANGLE | LARGE | SWITCHING TO MANUAL OPERATIONS OF ACCELERATOR, BRAKE, AND STEERING IS PROHIBITED | SWITCHING TO MANUAL OPERATIONS OF ONLY ACCELERATOR AND BRAKE IS PERMITTED |
| | SMALL | SWITCHING TO MANUAL OPERATION OF ONLY STEERING IS PERMITTED | SWITCHING TO MANUAL OPERATIONS OF ACCELERATOR, BRAKE, AND STEERING IS PERMITTED |

F I G . 3
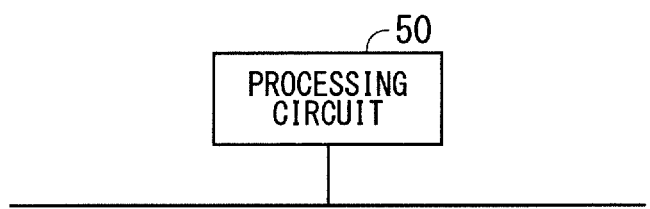
F I G . 4
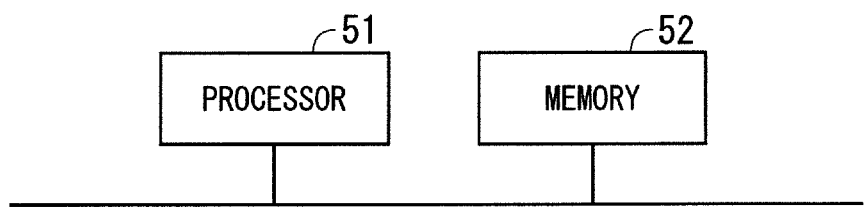

OPERATION AUTHORITY MANAGEMENT APPARATUS AND OPERATION AUTHORITY MANAGEMENT METHOD

TECHNICAL FIELD

The present invention relates to automatic driving of a vehicle, and more particularly to a technique for managing transfer of operation authority of an actuator of the vehicle.

BACKGROUND ART

In recent years, development of an automatic driving technique of a vehicle has been proceeding. When a driver manually drives a vehicle, the driver has operation authority of actuators (steering actuator, accelerator actuator, and brake actuator). On the other hand, when automatic driving of a vehicle is performed, a driving controller mounted on the vehicle has the operation authority of the actuators. In other words, switching between manual driving and automatic driving of the vehicle is performed by transferring the operation authority of the actuators between the driver and the driving controller.

In Patent Document 1 described below, disclosed is a vehicle driving assistance device which notifies a driver of cancellation of automatic driving in advance when it is determined, from conditions of a road ahead of a vehicle, that it is impossible to continue the automatic driving.

PRIOR ART DOCUMENTS

Patent Documents

[Patent Document 1] Japanese Patent Application Laid Open Gazette No. 2015-230573

SUMMARY

Problem to be Solved by the Invention

It is preferable that a timing of switching from automatic driving of a vehicle to manual driving should be when operations required when a driver starts the manual driving are easier. In accordance with the technique disclosed in Patent Document 1, since it is notified to the driver in advance that a situation will come where operations are so difficult that the automatic driving cannot respond thereto, the driver can start the manual driving in another situation where operations are relatively easy.

In the technique disclosed in Patent Document 1, when the switching from the automatic driving of the vehicle to manual driving is performed, the operation authorities for all the actuators are transferred to the driver at a time. For this reason, it is preferable that the driver should start the manual driving in a situation where no complicated operation is required for all the actuators. Depending on the road condition, however, there may be a possible case where it is difficult to find a place satisfying such a condition. Further, when the operation authorities for all the actuators are transferred to the driver at a time, the load imposed on the driver is larger.

The present invention is intended to solve such a problem as above, and it is an object of the present invention to reduce the load of a driver when switching from automatic driving of a vehicle to manual driving is performed.

Means to Solve the Problem

The present invention is also intended for an operation authority management apparatus which manages switching between automatic operation and manual operation of a plurality of actuators of a vehicle. According to the present invention, the operation authority management apparatus includes a vehicle behavior prediction unit to predict a behavior of the vehicle, a determination unit to determine, for each individual actuator, whether or not to permit switching of the actuator during the automatic operation to the manual operation on the basis of the behavior of the vehicle predicted by the vehicle behavior prediction unit, and a notification unit to notify a driver of the vehicle of a determination result made by the determination unit.

Effects of the Invention

By the present invention, the driver can perform the switching from the automatic operation of each actuator to the manual operation at an appropriate timing for the actuator. The load of the driver can be reduced as compared with the case where switching from the automatic operation to the manual operation is performed for all the actuators at the same time.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a diagram showing a constitution of an automatic driving system including an operation authority management apparatus in accordance with a first preferred embodiment;

FIG. 2 is a table showing an exemplary operation of a determination unit;

FIG. 3 is a view showing an exemplary hardware constitution of the operation authority management apparatus in accordance with the first preferred embodiment;

FIG. 4 is a view showing another exemplary hardware constitution of the operation authority management apparatus in accordance with the first preferred embodiment;

DESCRIPTION OF EMBODIMENT(S)

The First Preferred Embodiment

Figure 5:
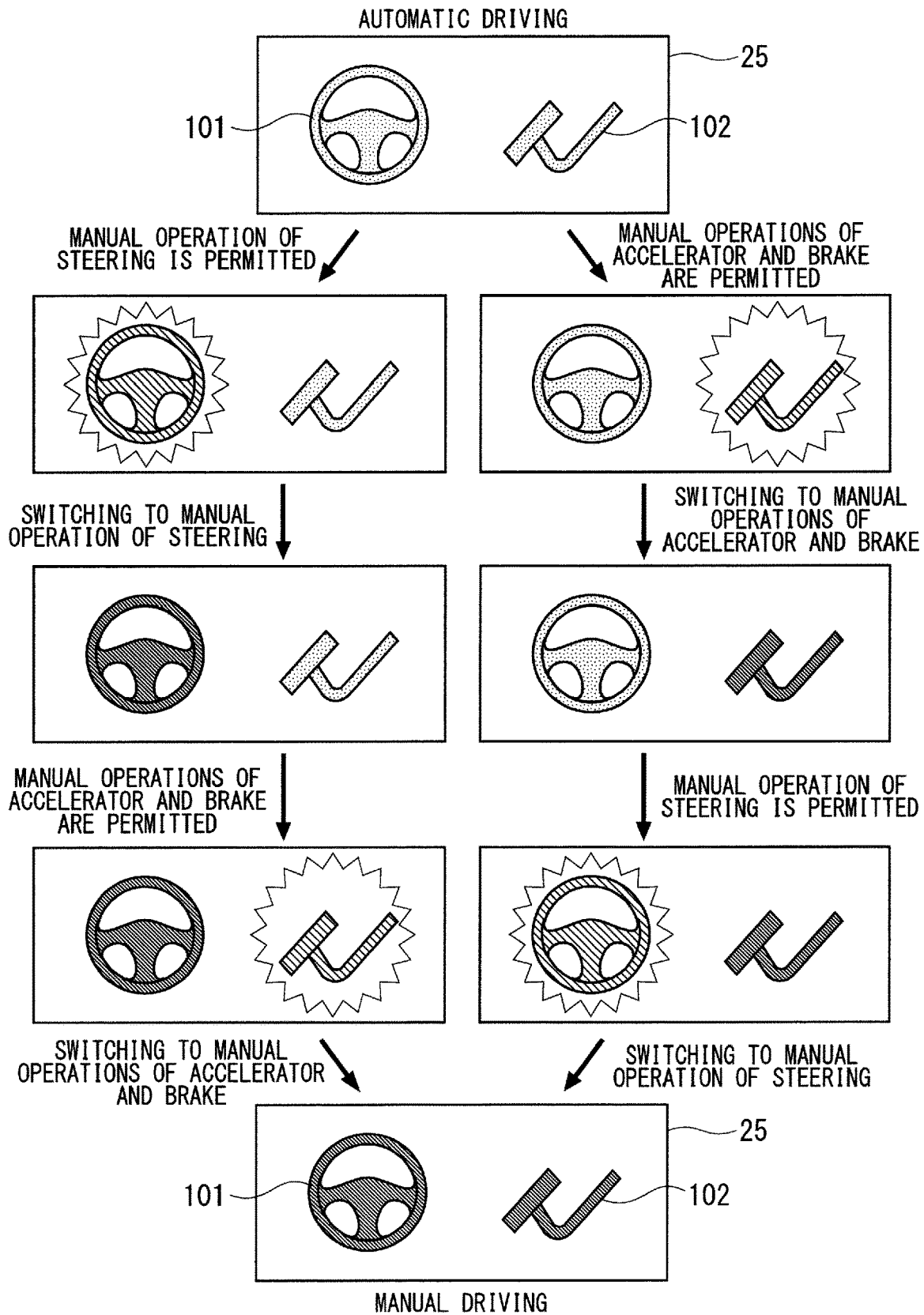
FIG. 5 is a view showing an exemplary image displayed on a display of the operation authority management apparatus in accordance with the first preferred embodiment.

FIG. 1 is a diagram showing a constitution of an automatic driving system in accordance with the first preferred embodiment. The automatic driving system is mounted on a vehicle and comprises an operation authority management apparatus 10 which manages operation authorities of a steering actuator 31, an accelerator actuator 32, and a brake actuator 33 which are actuators of the vehicle and a driving controller 20 which controls the steering actuator 31, the accelerator actuator 32, and the brake actuator 33 under the control of the operation authority management apparatus 10. Hereinafter, the steering actuator 31, the accelerator actuator 32, and the brake actuator 33 will be referred to collectively as "actuators". Further, the steering actuator 31, the accelerator actuator 32, and the brake actuator 33 will be referred to simply as a "steering 31", an "accelerator 32", and a "brake 33", respectively. Furthermore, a vehicle including the automatic driving system will be referred to as a "subject vehicle".

To the operation authority management apparatus 10, connected are a map data storage 21, a peripheral information detector 22, a communication device 23, a vehicle information acquisition device 24, a display 25, and an audio output device 26 which are mounted on the subject vehicle. The map data storage 21, the peripheral information detector 22, the communication device 23, and the vehicle information acquisition device 24 are also connected to the driving controller 20.

The map data storage 21 is a recording medium in which map data is stored. The map data storage 21 may be shared with a car navigation system (not shown) of the subject vehicle. The map data storage 21 may not be necessarily mounted on the subject vehicle but may be a server which transmits the map data to the operation authority management apparatus 10 via wireless communication.

The peripheral information detector 22 is a sensor such as a radar, a camera, or the like which detects positions of other vehicles, pedestrians, obstacles, carriageway marking lines (e.g., boundary lines of lanes and the like) on a road, and the like around the subject vehicle.

The communication device 23 performs communication with an information distribution system such as the VICS (Vehicle Information and Communication System: registered trademark) or the like, to thereby acquire traffic information (traffic jam information, traffic control information, construction section information, and the like), disaster information, weather information, and the like. Further, through communication (inter-vehicle communication) with other vehicles, the communication device 23 may also acquire information on positions, traveling directions, travel speeds, and the like of other vehicles.

The vehicle information acquisition device 24 acquires information indicating a current state of the subject vehicle, such as a current position, a traveling direction, a travel speed, a steering angle, and the like of the subject vehicle.

The driving controller 20 controls a plurality of actuators (the steering 31, the accelerator 32, and the brake 33), to thereby control the traveling of the subject vehicle. For example, when a driver has the operation authorities of the steering 31, the accelerator 32, and the brake 33, the driving controller 20 controls the actuators in accordance with driver's operations of a steering wheel, an accelerator pedal, and a brake pedal. On the other hand, when the driving controller 20 has the operation authorities of the steering 31, the accelerator 32, and the brake 33, the driving controller 20 performs automatic control over the actuators on the basis of various information acquired from the peripheral information detector 22, the communication device 23, and the vehicle information acquisition device 24, to thereby perform automatic driving of the subject vehicle. Hereinafter, the control over the actuator by the operation of the driver will be referred to as a "manual operation", and the automatic control over the actuator by the driving controller 20 will be referred to as an "automatic operation".

As the automatic operation of the steering 31, for example, performed are the control to prevent the subject vehicle from deviating from a traveling lane, the control to avoid pedestrians or obstacles, and the like. As the automatic operations of the accelerator 32 and the brake 33, performed are the control to make the subject vehicle travel at a constant speed, the control to make a distance from a preceding vehicle constant, the control to stop short of a pedestrian or an obstacle, and the like. Combination of the automatic operation of the steering 31 and the automatic operations of the accelerator 32 and the brake 33 makes it possible to make the subject vehicle travel following a specific vehicle (preceding vehicle) or make the subject vehicle travel along a route determined by the car navigation system.

Further, in the present preferred embodiment, since the transfer of the operation authority of the actuator between the driver and the driving controller 20 is performed for each individual actuator, there may be a case where some actuators are manually operated and the others are automatically operated. In the present specification, automatically operating all the steering 31, the accelerator 32, and the brake 33 is referred to as "automatic driving" and automatically operating some of these actuators is referred to as "semi-automatic driving". Further, manually operating all these actuators is referred to as "manual driving".

It is herein assumed that the automatic driving and the semi-automatic driving are not permitted on all roads but permitted only on predetermined "automatic driving permission sections". Sections on which neither the automatic driving nor the semi-automatic driving is permitted are referred to as "automatic driving prohibition sections". For example, it can be thought that automobile roads such as toll roads, expressways, and the like are determined as the automatic driving permission sections. Further, the automatic driving prohibition sections may be increased or decreased depending on the traffic situation, the disaster situation, and the weather. For example, it can be thought that a construction section, a flooded section, a snow-covered section, or the like is temporarily determined as the automatic driving prohibition section.

The operation authority management apparatus 10 manages the switching between the automatic operation and the manual operation of each actuator, i.e., the transfer of the operation authority of each actuator between the driver and the driving controller 20. As shown in FIG. 1, the operation authority management apparatus 10 comprises a vehicle behavior prediction unit 11, a determination unit 12, and a notification unit 13.

The vehicle behavior prediction unit 11 predicts a behavior of the subject vehicle on the basis of various information acquired from the map data storage 21, the peripheral information detector 22, the communication device 23, and the vehicle information acquisition device 24. For example, a road shape ahead of the subject vehicle is figured out from the current position and the traveling direction of the subject vehicle and the map data, and a variation in steering angle of the steering 31 of the subject vehicle can be predicted from the road shape. Further, by adding the travel speed of the subject vehicle thereto, the amount of variation in steering angle of the steering 31 per unit time (hereinafter, referred to simply as "the amount of variation in steering angle") can be predicted. Further, for example, operation frequencies of the accelerator 32 and the brake 33 can be predicted from the travel speed of the subject vehicle, a distance from a preceding vehicle, a congestion situation of a road ahead of the subject vehicle, and the like, and the amount of variation in travel speed per unit time (hereinafter, referred to simply as "the amount of variation in travel speed") can be predicted from the result. Furthermore, by additionally taking a result of detecting whether or not there is an obstacle, the disaster information, the weather information, and the like into consideration, the predictability on the behavior of the subject vehicle can be increased.

The determination unit 12 determines, for each individual actuator, whether or not to permit the switching of the actuator during the automatic operation to the manual operation (in other words, the transfer of the operation authority from the driving controller 20 to the driver) on the basis of the behavior of the subject vehicle predicted by the vehicle behavior prediction unit 11. Since both the accelerator 32 and the brake 33 are actuators which control the travel speed of the subject vehicle, however, it is assumed that the transfers of the operation authorities of these actuators are performed at the same time.

In the present preferred embodiment, it is assumed that the determination unit 12 makes determination based on respective predicted values of the amounts of variations in travel speed and steering angle of the subject vehicle. Specifically, as shown in FIG. 2, the determination unit 12 does not permit the switching from the automatic operation of the steering 31 to the manual operation thereof when it is predicted that the amount of variation in steering angle is larger than a predetermined threshold value. It can be thereby prevented to switch the operation of the steering 31 to the manual operation in a situation where a complicated operation of the steering 31 is required. Further, the determination unit 12 does not permit the switching from the automatic operations of the accelerator 32 and the brake 33 to the manual operations thereof when it is predicted that the amount of variation in travel speed is larger than a predetermined threshold value. It can be thereby prevented to switch the operations of the accelerator 32 and the brake 33 to the manual operations in a situation where respective complicated operations of the accelerator 32 and the brake 33 are required. As a result, it is possible to reduce the load of the driver when the automatic driving of the subject vehicle is switched to the manual driving.

Further, it is assumed that the switching from the manual driving of the subject vehicle to automatic driving (in other words, the transfer of the operation authority from the driver to the driving controller 20) can be performed by the driver at any timing only if the subject vehicle is within the automatic driving permission section. This is because the driver usually has no load since the switching from the manual driving to the automatic driving means that the driver becomes free from the manual operation.

The notification unit 13 notifies the driver of the subject vehicle of a determination result made by the determination unit 12 by using the display 25 and the audio output device 26. A specific example of an operation of the notification unit 13 will be described later.

Further, the display 25 may be a general-type flat panel display, and may be also, for example, a 3D display capable of displaying a three-dimensional image with a depth, a head up display (HUD) capable of displaying an image as a virtual image directly in a visual field of the driver, or the like. Furthermore, as the display 25, a display unit of another device such as a navigation device, a smartphone, or the like can be used.

FIGS. 3 and 4 are views each showing an exemplary hardware constitution of the operation authority management apparatus 10. The constituent elements (the vehicle behavior prediction unit 11, the determination unit 12, and the notification unit 13) of the operation authority management apparatus 10 shown in FIG. 1 are implemented by, for example, a processing circuit 50 shown in FIG. 3. Specifically, the processing circuit 50 comprises the vehicle behavior prediction unit 11 which predicts a behavior of the subject vehicle, the determination unit 12 which determines, for each individual actuator, whether or not to permit the switching of the actuator during the automatic operation to the manual operation on the basis of the behavior of the subject vehicle predicted by the vehicle behavior prediction unit 11, and the notification unit 13 which notifies the driver of the subject vehicle of a determination result made by the determination unit 12. To the processing circuit 50, a dedicated hardware may be applied, or a processor (central processing unit (CPU), processing unit, arithmetic unit (AU), microprocessor, microcomputer, or digital signal processor (DSP)) which executes a program stored in a memory may be applied.

When the processing circuit 50 is a dedicated hardware, the processing circuit 50 corresponds to, for example, a single circuit, a complex circuit, a programmed processor, a multiple programmed processor, an ASIC (Application Specific Integrated Circuit), a FPGA (Field Programmable Gate Array), a combination of these circuits, or the like. Respective functions of the constituent elements in the operation authority management apparatus 10 may be implemented by a plurality of processing circuits, or these functions may be collectively implemented by one processing circuit.

FIG. 4 shows a hardware constitution of the operation authority management apparatus 10 in a case where the processing circuit 50 is a processor. In this case, the respective functions of the constituent elements in the operation authority management apparatus 10 are implemented by combination with software or the like (software, firmware, or software and firmware). The software or the like is described as a program and stored in a memory 52. The processor 51 as the processing circuit 50 reads and executes the program stored in the memory 52, to thereby implement the respective functions of the constituent elements. Specifically, the operation authority management apparatus 10 comprises the memory 52 which stores therein programs which are executed by the processing circuit 50, to thereby consequently perform an operation of predicting a behavior of the subject vehicle, an operation of determining, for each individual actuator, whether or not to permit the switching of the actuator during the automatic operation to the manual operation on the basis of the predicted behavior of the subject vehicle, and an operation of notifying the driver of the subject vehicle of the determination result. In other words, the program is executed to cause a computer to perform a procedure or a method of the respective operations of the constituent elements in the operation authority management apparatus 10.

Herein, the memory 52 corresponds to, for example, a nonvolatile or volatile semiconductor memory such as a RAM (Random Access Memory), a ROM (Read Only Memory), a flash memory, an EPROM (Erasable Programmable Read Only Memory), an EEPROM (Electrically Erasable Programmable Read Only Memory), or the like, a HDD (Hard Disk Drive), a magnetic disk, a flexible disk, an optical disk, a compact disk, a mini disk, a DVD (Digital Versatile Disc), a drive unit thereof, or the like.

The case has been described above where the respective functions of the constituent elements in the operation authority management apparatus 10 are implemented by one of hardware and software or the like. This is, however, only one exemplary case. There may be a case where some of the constituent elements in the operation authority management apparatus 10 are implemented by a dedicated hardware and the other constituent elements are implemented by software or the like. For example, respective functions of some of the constituent elements are implemented by the processing circuit 50 as the dedicated hardware, and respective functions of the other constituent elements are implemented when the processing circuit 50 as the processor 51 reads and executes the programs stored in the memory 52.

Thus, in the operation authority management apparatus 10, the above-described functions can be implemented by hardware, software or the like, or combination thereof.

FIG. 5 is a view showing an exemplary image which the notification unit 13 of the operation authority management apparatus 10 displays on the display 25 in order to notify the driver of the determination result made by the determination unit 12. An operation of the operation authority management apparatus 10 will be described, with reference to FIGS. 1 and 5. Since the characteristic feature of the operation authority management apparatus 10 lies in an operation at the time when the switching from the automatic driving of the subject vehicle to the manual driving is performed, the operation at that time will be mainly described hereafter, and an operation at the time when the switching from the manual driving to the automatic driving is performed will be omitted.

The notification unit 13 causes a steering image 101 corresponding to the steering 31 and an accelerator/brake image 102 corresponding to the accelerator 32 and the brake 33 to be displayed on a screen of the display 25 as shown in FIG. 5. Further, the notification unit 13 changes respective display modes of the steering image 101 and the accelerator/brake image 102, to thereby notify the driver of a state of the operation authorities of the steering 31, the accelerator 32, and the brake 33 (in other words, whether during the automatic operation or during the manual operation) and the determination result made by the determination unit 12 (in other words, whether the switching to the manual operation is permitted or not).

Specifically, the notification unit 13 displays an image corresponding to the actuator during the automatic operation in a first display mode (e.g., in gray color), displays an image corresponding to the actuator which is permitted to switch to the manual operation in a second display mode (e.g., of blink display in red and blue colors), and displays an image corresponding to the actuator during the manual operation in a third display mode (e.g., in blue color).

During the automatic driving, i.e., when all the steering 31, the accelerator 32, and the brake 33 are automatically operated, the steering image 101 and the accelerator/brake image 102 are displayed in the first display mode as shown in the top stage of FIG. 5.

In this state, for example, when the determination unit 12 permits the manual operation of the steering 31, the notification unit 13 changes the display mode of the steering image 101 to the second display mode (on the left side of the second stage of FIG. 5). At that time, the notification unit 13 may use the audio output device 26 to output sound or a message indicating that the manual operation of the steering 31 is permitted.

Then, when the driver performs an operation for switching the operation of the steering 31 to the manual operation (for example, an override operation with the steering wheel), the operation of the steering 31 is switched to the manual operation and the operations of the accelerator 32 and the brake 33 are kept automatic. In other words, the subject vehicle is brought into the semi-automatic driving. At that time, the notification unit 13 changes the display mode of the steering image 101 to the third display mode and keeps the display mode of the accelerator/brake image 102 in the first display mode (on the left side of the third stage of FIG. 5).

Further, when the determination unit 12 permits the manual operations of the accelerator 32 and the brake 33, the notification unit 13 changes the display mode of the accelerator/brake image 102 to the second display mode (on the left side of the fourth stage of FIG. 5). At that time, the notification unit 13 may use the audio output device 26 to output sound or a message indicating that the manual operations of the accelerator 32 and the brake 33 are permitted.

Then, when the driver performs an operation for switching the operations of the accelerator 32 and the brake 33 to the manual operations (for example, an override operation with the accelerator pedal or the brake pedal), the operations of the accelerator 32 and the brake 33 are also switched to the manual operations, and the subject vehicle is brought into the manual driving. At that time, the notification unit 13 changes the display mode of the accelerator/brake image 102 to the third display mode. As a result, as shown in the bottom stage of FIG. 5, both the steering image 101 and the accelerator/brake image 102 are displayed in the third display mode.

On the other hand, in the state shown on the top stage of FIG. 5, when the determination unit 12 permits the manual operations of the accelerator 32 and the brake 33, the notification unit 13 changes the display mode of the accelerator/brake image 102 to the second display mode (on the right side of the second stage of FIG. 5). At that time, the notification unit 13 may use the audio output device 26 to output sound or a message indicating that the manual operations of the accelerator 32 and the brake 33 are permitted.

Then, when the driver performs the operation for switching the operations of the accelerator 32 and the brake 33 to the manual operations, the operations of the accelerator 32 and the brake 33 are switched to the manual operations, and the operation of the steering 31 is kept automatic. In other words, the subject vehicle is brought into the semi-automatic driving. At that time, the notification unit 13 changes the display mode of the accelerator/brake image 102 to the third display mode and keeps the display mode of the steering image 101 in the first display mode (on the right side of the third stage of FIG. 5).

Further, when the determination unit 12 permits the manual operation of the steering 31, the notification unit 13 changes the display mode of the steering image 101 to the second display mode (on the right side of the fourth stage of FIG. 5). At that time, the notification unit 13 may use the audio output device 26 to output sound or a message indicating that the manual operation of the steering 31 is permitted.

Then, when the driver performs the operation for switching the operation of the steering 31 to the manual operation, the operation of the steering 31 is switched to the manual operation, and the subject vehicle is brought into the manual driving. At that time, the notification unit 13 changes the display mode of the steering image 101 to the third display mode. As a result, as shown in the bottom stage of FIG. 5, both the steering image 101 and the accelerator/brake image 102 are displayed in the third display mode.

Thus, by the operation authority management apparatus 10 in accordance with the first preferred embodiment, the driver can know the determination result made by the determination unit 12 in real time from the images displayed on the display 25 and the voice (sound) outputted from the audio output device 26. For this reason, the driver can perform the switching to the manual operation of each actuator at an appropriate timing. Therefore, it is possible to reduce the load of the driver at the switching from the automatic operation to the manual operation.

Further, the notification unit 13 may not only indicate the state of the actuator but also give the driver a notification which suggests switching of the operation of the actuator to the manual operation when the actuator is permitted to switch to the manual operation. Furthermore, though the operation for switching from the automatic operation of the actuator to the manual operation is the override operation in the above description, for example, an operation switch dedicated to starting the manual operation may be provided in the subject vehicle.

Further, even though the subject vehicle approaches the automatic driving prohibition section, when the switching to the manual operation of the actuator is not permitted, in order to bring the subject vehicle into the state where the switching is permitted, the operation authority management apparatus 10 may control the traveling of the subject vehicle by using the driving controller 20. For example, when the manual operation of the steering 31 is not permitted since the amount of variation in steering angle per unit time is predicted to be larger, if the operation authority management apparatus 10 reduces the travel speed of the subject vehicle, the subject vehicle is brought into the state where the manual operation of the steering 31 is permitted since the amount of variation in steering angle per unit time becomes smaller. Further, when the manual operations of the accelerator 32 and the brake 33 are not permitted since the amount of variation in travel speed per unit time is predicted to be larger, if the operation authority management apparatus 10 reduces the travel speed of the subject vehicle, to increase the distance from the preceding vehicle, the subject vehicle is brought into the state where the manual operations of the accelerator 32 and the brake 33 are permitted since the amount of variation in travel speed per unit time becomes smaller.

Figure 6:
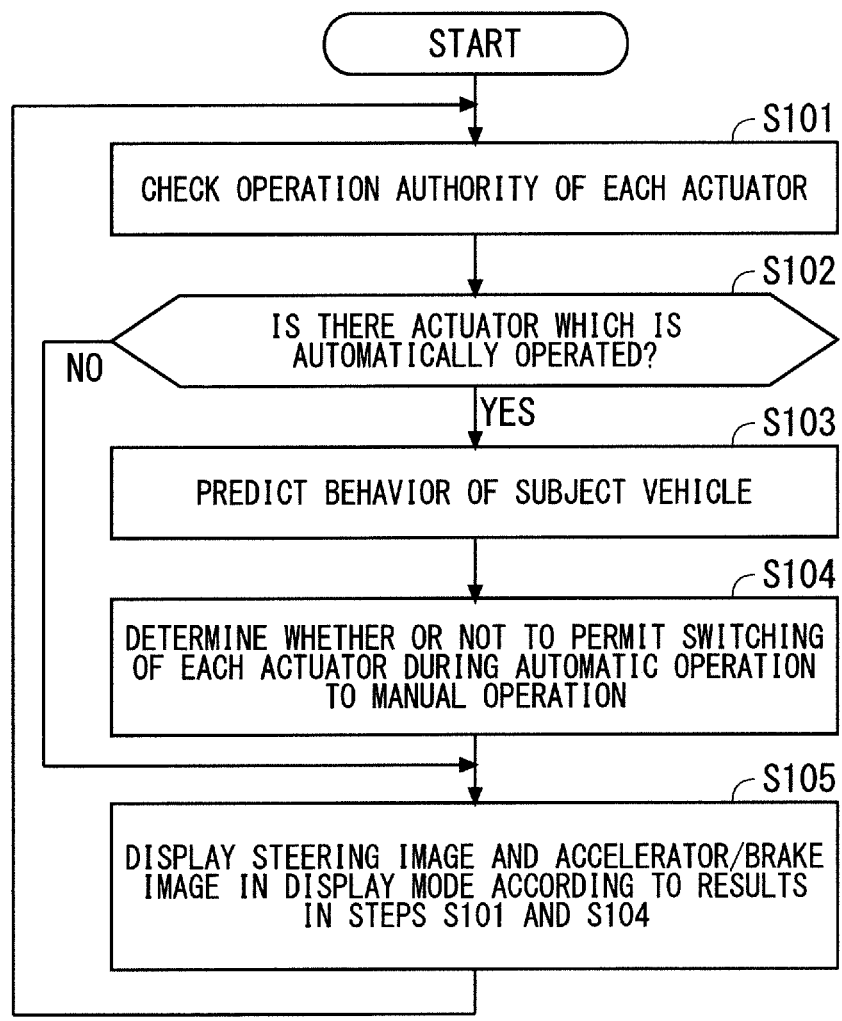
FIG. 6 is a flowchart showing an operation of the operation authority management apparatus in accordance with the first preferred embodiment.

FIG. 6 is a flowchart showing the operation of the operation authority management apparatus 10. The above-described operation of the operation authority management apparatus 10 is executed when the operation authority management apparatus 10 performs the process steps shown in FIG. 6. Hereafter, the operation of the operation authority management apparatus 10 will be described with reference to FIG. 6.

After the operation authority management apparatus 10 starts the operation, first, the determination unit 12 checks whether the driver or the driving controller 20 has the operation authority of each actuator (the steering 31, the accelerator 32, and the brake 33) (Step S101). In other words, the determination unit 12 checks which of the actuators is manually operated and which of the actuators is automatically operated.

When there is an actuator which is automatically operated ("YES" in Step S102), the vehicle behavior prediction unit 11 predicts a behavior of the subject vehicle on the basis of various information acquired from the map data storage 21, the peripheral information detector 22, the communication device 23, and the vehicle information acquisition device 24 (Step S103). Then, the determination unit 12 determines, for each individual actuator, whether or not to permit the switching of the actuator during the automatic operation to the manual operation on the basis of the behavior of the subject vehicle which is predicted by the vehicle behavior prediction unit 11 (Step S104).

After that, as shown in FIG. 5, the notification unit 13 displays the steering image 101 and the accelerator/brake image 102 on the display 25 in the display modes according to the operation authority of each actuator found in Step S101 and the determination result made in Step S104 (Step S105).

Further, in Step S102, when there is no actuator which is automatically operated ("NO" in Step S102), since it is not necessary to perform determination on the switching to the manual operation, the operations in Steps S103 and S104 are omitted and the process goes to Step S105. In this case, the notification unit 13 displays the steering image 101 and the accelerator/brake image 102 in the third display mode on the basis of the respective operation authorities of the actuators found in Step S101, as shown in the bottom stage of FIG. 5, to thereby indicate that all the actuators are manually driven.

In the present preferred embodiment, though the determination unit 12 determines whether or not to permit the switching from the automatic operation to the manual operation for each actuator on the basis of the predicted values of the amounts of variations in steering angle and travel speed, some conditions may be further added. For example, when the subject vehicle travels side by side with another vehicle, regardless of the predicted behavior of the subject vehicle, the switching from the automatic operation of the steering 31 to the manual operation thereof may not be permitted. Further, when the subject vehicle travels on a sloping road or a congested road, the switching from the automatic operations of the accelerator 32 and the brake 33 to the manual operations thereof may not be permitted.

Further, for example, when a distance between the subject vehicle and a following vehicle is smaller than a predetermined threshold value, the switching from the automatic operations of the accelerator 32 and the brake 33 to the manual operations thereof may not be permitted. Furthermore, when the subject vehicle travels following a preceding vehicle and the preceding vehicle accelerates or decelerates, the switching from the automatic operations of the accelerator 32 and the brake 33 to the manual operations thereof may not be permitted.

Further, the images displayed on the display 25 by the notification unit 13 are not limited to those shown in FIG. 5. For example, there may be a case where an image representing the automatic operation of each actuator (automatic actuator image) and an image representing the manual operation of each actuator (manual actuator image) are displayed, being arranged side by side, on the display 25 and the determination result made by the determination unit 12 is represented by the display modes of the automatic actuator image and the manual actuator image.

Figure 7:
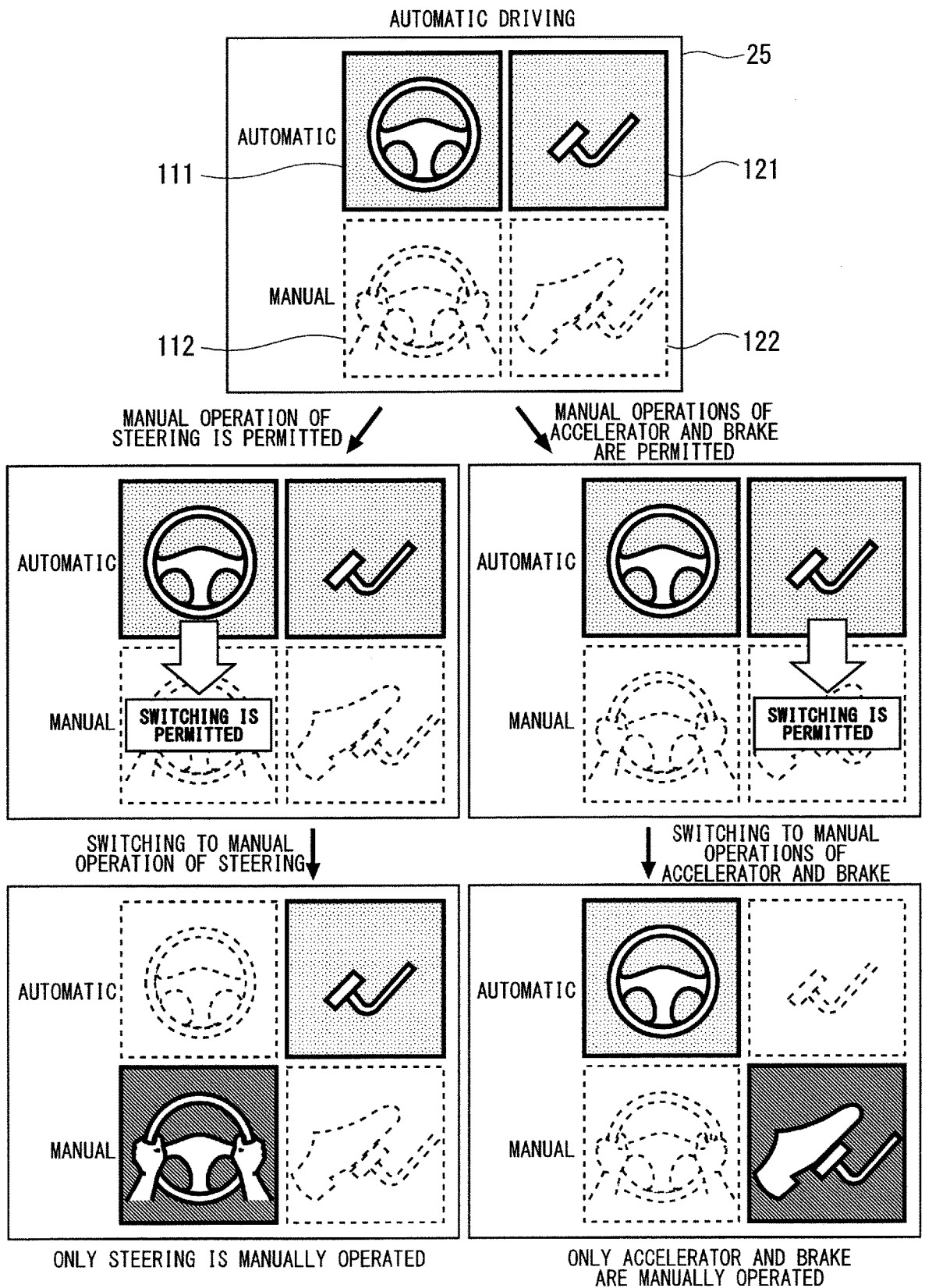
FIG. 7 is a view showing an exemplary image displayed on the display of the operation authority management apparatus in accordance with the first preferred embodiment.
Figure 8:
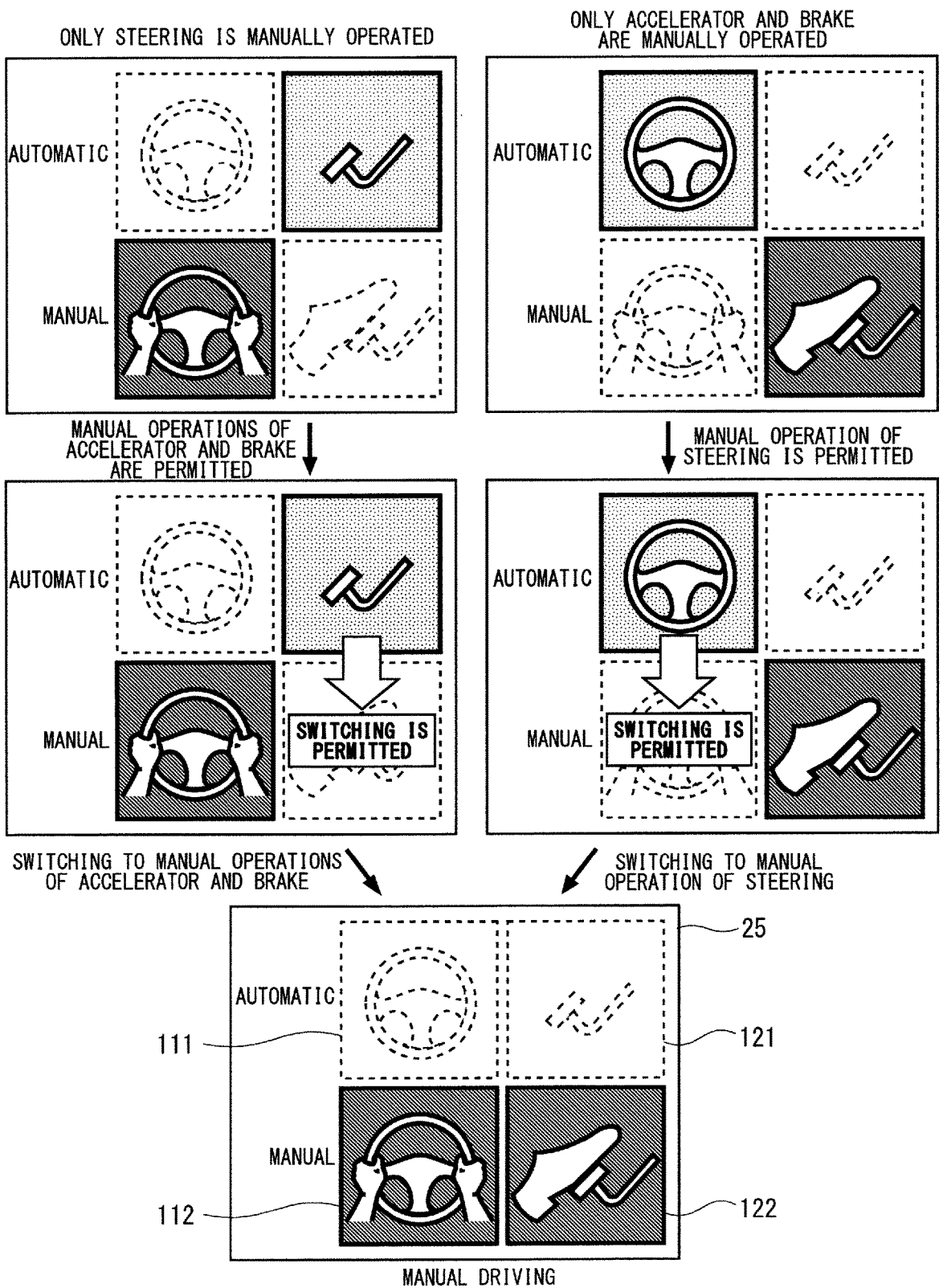
FIG. 8 is a view showing an exemplary image displayed on the display of the operation authority management apparatus in accordance with the first preferred embodiment.

Specific examples thereof are shown in FIGS. 7 and 8. In FIGS. 7 and 8, an automatic steering image 111 representing the automatic operation of the steering 31, an automatic accelerator/brake image 121 representing the automatic operations of the accelerator 32 and the brake 33, a manual steering image 112 representing the manual operation of the steering 31, and an manual accelerator/brake image 122 representing the manual operations of the accelerator 32 and the brake 33 are displayed, being arranged in a matrix, on the screen of the display 25. Hereinafter, display examples on the display 25 in cases using these images will be described.

During the automatic driving of the subject vehicle, as shown in the upper stage of FIG. 7, the notification unit 13 displays the automatic steering image 111 and the automatic accelerator/brake image 121 in an outstanding display mode (e.g., in blue color) and displays the manual steering image 112 and the manual accelerator/brake image 122 in an indistinctive display mode (e.g., in dark gray color), to thereby represent that all the steering 31, the accelerator 32, and the brake 33 are automatically operated.

In this state, for example, when the determination unit 12 permits the manual operation of the steering 31, the notification unit 13 changes the display mode of the manual steering image 112 to a display mode in which the characters "switching is permitted" are added (on the left side of the middle stage of FIG. 7). Then, when the driver performs the operation for switching the operation of the steering 31 to the manual operation, the operation of the steering 31 is switched to the manual operation and the operations of the accelerator 32 and the brake 33 are kept automatic. At that time, the notification unit 13 changes the display mode of the manual steering image 112 to an outstanding display mode (e.g., in red color) and changes the display mode of the automatic steering image 111 to an indistinctive display mode (e.g., in dark gray color) (on the left side of the lower stage of FIG. 7).

With reference to FIG. 8, in the state where only the steering 31 is manually operated (on the left side of the upper stage of FIG. 8), when the determination unit 12 permits the manual operations of the accelerator 32 and the brake 33, the notification unit 13 changes the display mode of the manual accelerator/brake image 122 to the display mode in which the characters "switching is permitted" are added (on the left side of the middle stage of FIG. 8). Then, when the driver performs the operation for switching the operations of the accelerator 32 and the brake 33 to the manual operations, the operations of the accelerator 32 and the brake 33 are also switched to the manual operations. At that time, the notification unit 13 changes the color of the manual accelerator/brake image 122 to the outstanding display mode (e.g., in red color) and changes the display mode of the automatic accelerator/brake image 121 to the indistinctive display mode (e.g., in dark gray color). As a result, as shown in the lower stage of FIG. 8, the manual steering image 112 and the manual accelerator/brake image 122 are displayed in the outstanding display mode.

Further, in the state shown in the upper stage of FIG. 7, when the determination unit 12 permits the manual operations of the accelerator 32 and the brake 33, the notification unit 13 changes the display mode of the manual accelerator/brake image 122 to the display mode in which the characters "switching is permitted" are added (on the right side of the middle stage of FIG. 7). Then, when the driver performs the operation for switching the operations of the accelerator 32 and the brake 33 to the manual operations, the operations of the accelerator 32 and the brake 33 are switched to the manual operations and the operation of the steering 31 is kept automatic. At that time, the notification unit 13 changes the display mode of the manual accelerator/brake image 122 to the outstanding display mode (e.g., in red color) and changes the display mode of the automatic accelerator/brake image 121 to the indistinctive display mode (e.g., in dark gray color) (on the right side of the lower stage of FIG. 7).

With reference to FIG. 8, in the state where only the accelerator 32 and the brake 33 are manually operated (on the right side of the upper stage of FIG. 8), when the determination unit 12 permits the manual operation of the steering 31, the notification unit 13 changes the display mode of the manual steering image 112 to the display mode in which the characters "switching is permitted" are added (on the right side of the middle stage of FIG. 8). Then, when the driver performs the operation for switching the operation of the steering 31 to the manual operation, the operation of the steering 31 is switched to the manual operation. At that time, the notification unit 13 changes the color of the manual steering image 112 to the outstanding display mode (e.g., in red color) and changes the display mode of the automatic steering image 111 to the indistinctive display mode (e.g., in dark gray color). As a result, as shown in the lower stage of FIG. 8, the manual steering image 112 and the manual accelerator/brake image 122 are displayed in the outstanding display mode.

Also by using the images shown in FIGS. 7 and 8, it is possible to produce the same effect as that in the case using the images shown in FIG. 5.

The Second Preferred Embodiment

In the second preferred embodiment, proposed is an operation authority management apparatus which makes an "operation authority transfer plan" that is a plan to transfer the operation authority of each actuator from the driver to the driving controller before it becomes necessary to switch the subject vehicle from the automatic driving to the manual driving.

Figure 9:
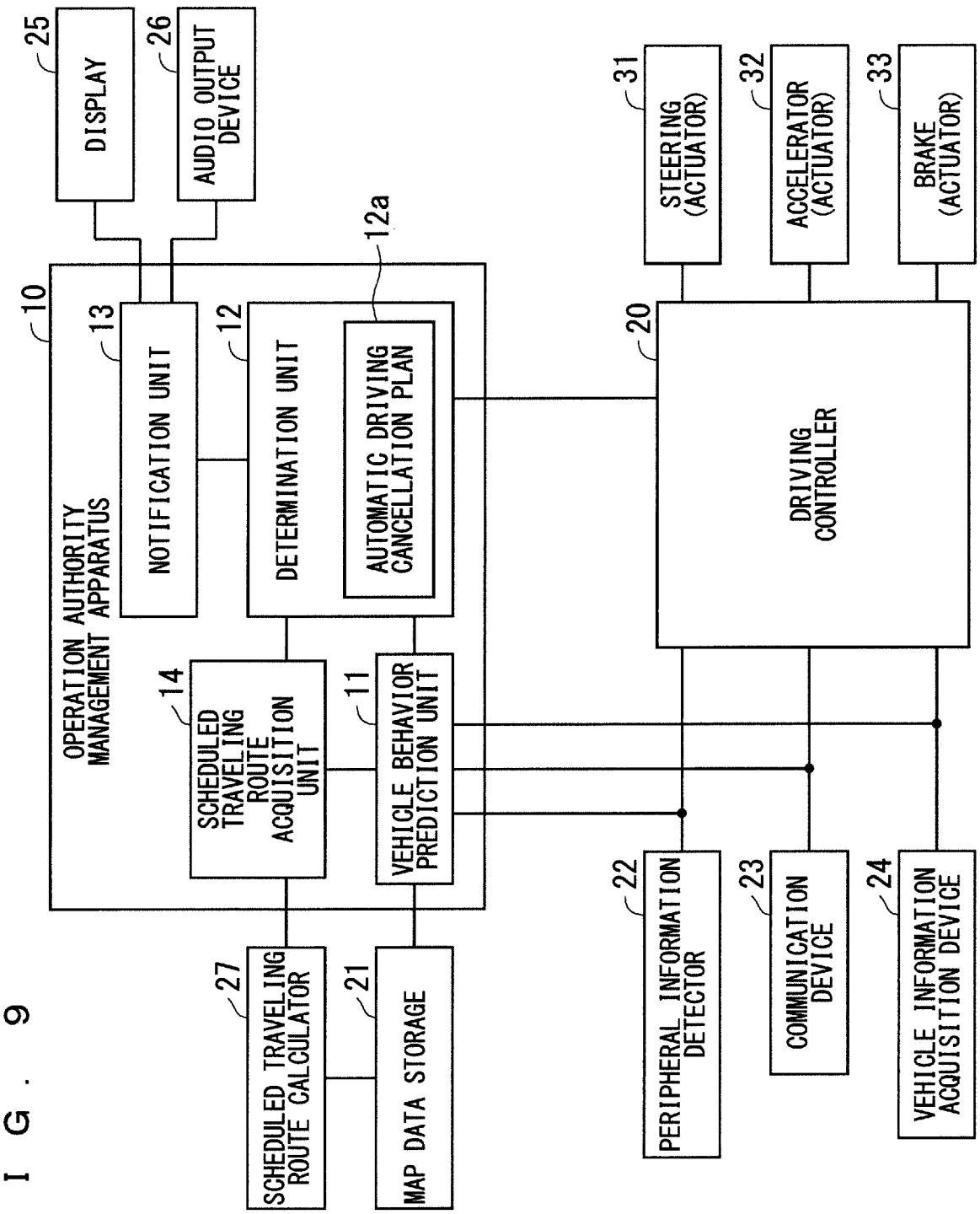
FIG. 9 is a diagram showing a constitution of an automatic driving system including an operation authority management apparatus in accordance with a second preferred embodiment.

FIG. 9 is a diagram showing a constitution of an automatic driving system including the operation authority management apparatus in accordance with the second preferred embodiment. In the constitution of the automatic driving system, a scheduled traveling route calculator 27 is added to the constitution shown in FIG. 1 and a scheduled traveling route acquisition unit 14 is added to the operation authority management apparatus 10. The scheduled traveling route calculator 27 calculates a scheduled traveling route from the current position of the subject vehicle to a destination. The scheduled traveling route acquisition unit 14 of the operation authority management apparatus 10 acquires information on the scheduled traveling route calculated by the scheduled traveling route calculator 27.

Further, the vehicle behavior prediction unit 11 of the operation authority management apparatus 10 predicts a behavior of the subject vehicle in each section (including the current position) on the scheduled traveling route on the basis of the scheduled traveling route of the subject vehicle which is acquired by the scheduled traveling route acquisition unit 14 and various information acquired from the map data storage 21, the peripheral information detector 22, the communication device 23, and the vehicle information acquisition device 24.

The determination unit 12 determines whether or not to permit the switching of the actuator during the automatic operation to the manual operation for each section on the scheduled traveling route on the basis of the behavior of the subject vehicle predicted by the vehicle behavior prediction unit 11. Further, the determination unit 12 stores therein the determination results as an automatic driving cancellation plan 12a which is an operation authority transfer plan. The notification unit 13 notifies the driver of the subject vehicle of a content of the automatic driving cancellation plan 12a by using the display 25 and the audio output device 26.

Further, the scheduled traveling route calculator 27 may be shared with a car navigation system (not shown) of the subject vehicle. Like the map data storage 21, the scheduled traveling route calculator 27 may be also a server which performs wireless communication with the operation authority management apparatus 10. In this case, the scheduled traveling route calculator 27 acquires information on the current position of the subject vehicle and the destination from the car navigation system of the subject vehicle and the like, calculates the scheduled traveling route, and transmits the calculated scheduled traveling route to the operation authority management apparatus 10.

Figure 10:
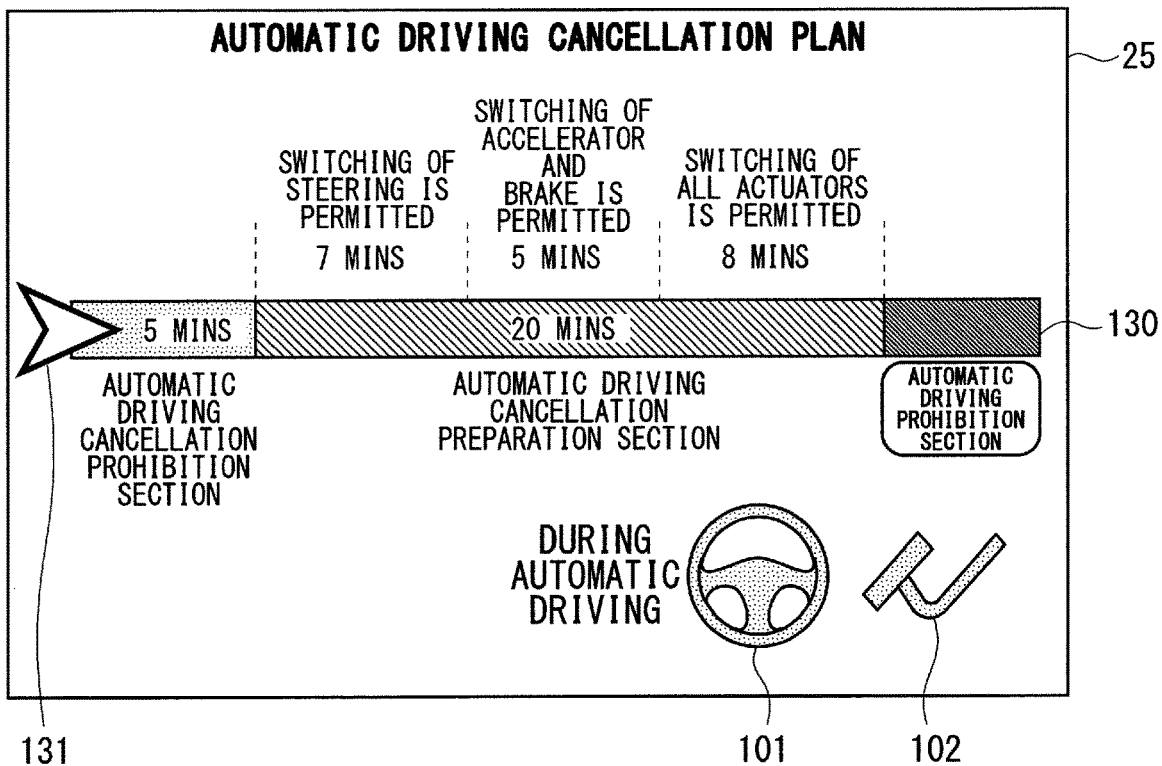
FIG. 10 is a view showing an exemplary image displayed on the display of the operation authority management apparatus in accordance with the second preferred embodiment.

FIG. 10 is a view showing an exemplary image which the notification unit 13 of the operation authority management apparatus 10 displays on the display 25 in order to notify the driver of the content of the automatic driving cancellation plan 12a (the determination result for each section on the scheduled traveling route, which is made by the determination unit 12).

A case is assumed, for example, where the subject vehicle during the automatic driving will reach the automatic driving prohibition section twenty-five minutes later if the subject vehicle travels along the scheduled traveling route. Further, it is assumed that the vehicle behavior prediction unit 11 predicts that both the amount of variation in steering angle and the amount of variation in travel speed will become larger in a section from the current position of the subject vehicle to a position after five minutes of traveling, only the amount of variation in travel speed will become larger in a section from the position after five minutes of traveling to a position after twelve minutes of traveling, only the amount of variation in steering angle will become larger in a section from the position after twelve minutes of traveling to a position after seventeen minutes of traveling, and both the amount of variation in steering angle and the amount of variation in travel speed will become smaller in a section from the position after seventeen minutes of traveling to a position after twenty-five minutes of traveling.

At that time, the determination unit 12 determines the section from the current position of the subject vehicle to the position after five minutes of traveling as a section where the switching to the manual operations of all the steering 31, the accelerator 32, and the brake 33 is not permitted, determines the section from the position after five minutes of traveling to the position after twelve minutes of traveling as a section where the switching to the manual operation of only the steering 31 is permitted, determines the section from the position after twelve minutes of traveling to the position after seventeen minutes of traveling as a section where the switching to the manual operations of only the accelerator 32 and the brake 33 is permitted, and determines the section from the position after seventeen minutes of traveling to the position after twenty-five minutes of traveling as a section where the switching to the manual operations of all the steering 31, the accelerator 32, and the brake 33 is permitted. The determination results constitute an automatic driving cancellation plan 12a.

Herein, the section where the switching to the manual operations of all the steering 31, the accelerator 32, and the brake 33 is not permitted is defined as an "automatic driving cancellation prohibition section" and the sections where switching to the manual operations of either the steering 31 or the accelerator 32 and the brake 33 is permitted is defined as an "automatic driving cancellation preparation section".

The notification unit 13 displays the content of the automatic driving cancellation plan 12a together with an image representing a positional relation between the current position of the subject vehicle and each section on the scheduled traveling route on the display 25. In the exemplary case of FIG. 10, the positional relation between the current position of the subject vehicle and each section on the scheduled traveling route is represented by superimposing an image 131 (referred to as a "subject vehicle mark") representing the current position of the subject vehicle on an image 130 (referred to as a "scale image") of a figure linearly representing each section on the scheduled traveling route. The content of the automatic driving cancellation plan 12a is represented by color and characters of the scale image 130. Specifically, the scale image 130 is color-coded into the automatic driving cancellation prohibition section, the automatic driving cancellation preparation section, and the automatic driving prohibition section. Particularly, it is preferable that the image and the characters representing the automatic driving prohibition section where the switching to the manual operation is required should be displayed in a display mode which is more outstanding than others, as shown in FIG. 10. Further, in this exemplary case, the determination result made by the determination unit 12 at this point in time is represented by the steering image 101 and the accelerator/brake image 102 shown in the first preferred embodiment.

After the subject vehicle starts traveling, the notification unit 13 moves a display position of the subject vehicle mark 131 on the scale image 130 in accordance with the change of the current position. Further, the notification unit 13 displays the determination result made by the determination unit 12 at this point in time in real time by using the steering image 101 and the accelerator/brake image 102.

Figure 11:
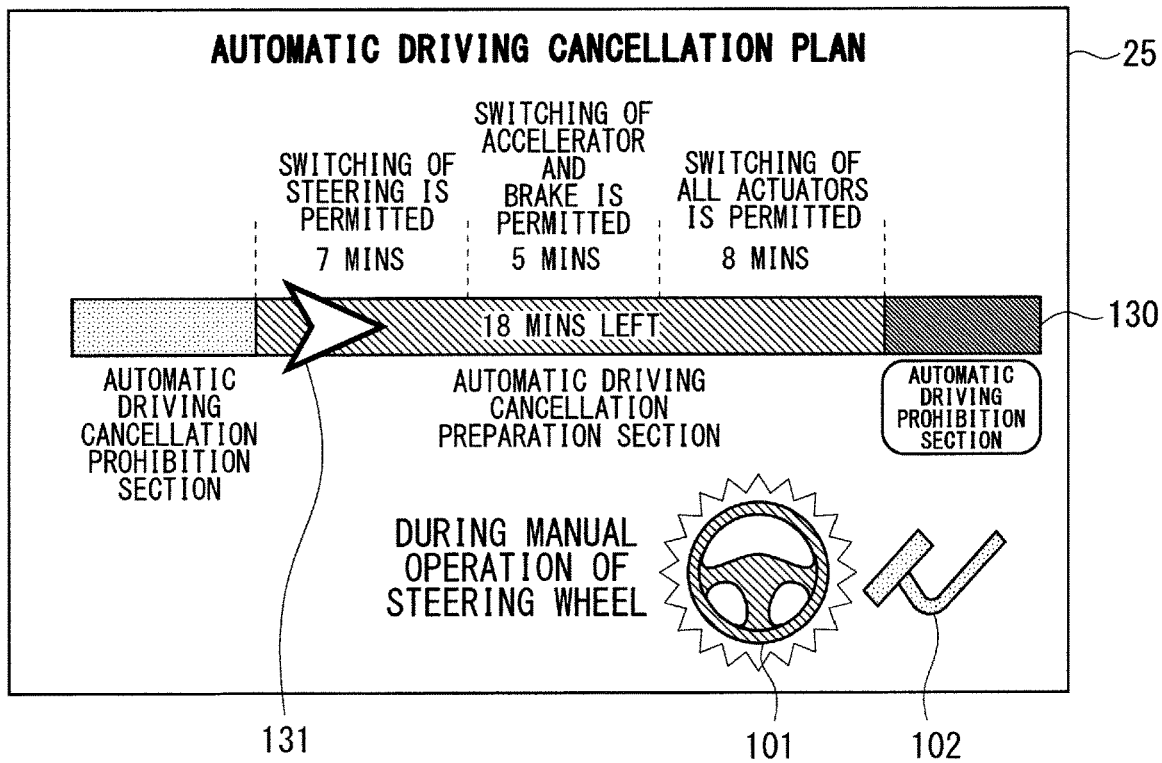
FIG. 11 is a view showing an exemplary image displayed on the display of the operation authority management apparatus in accordance with the second preferred embodiment.
Figure 12:
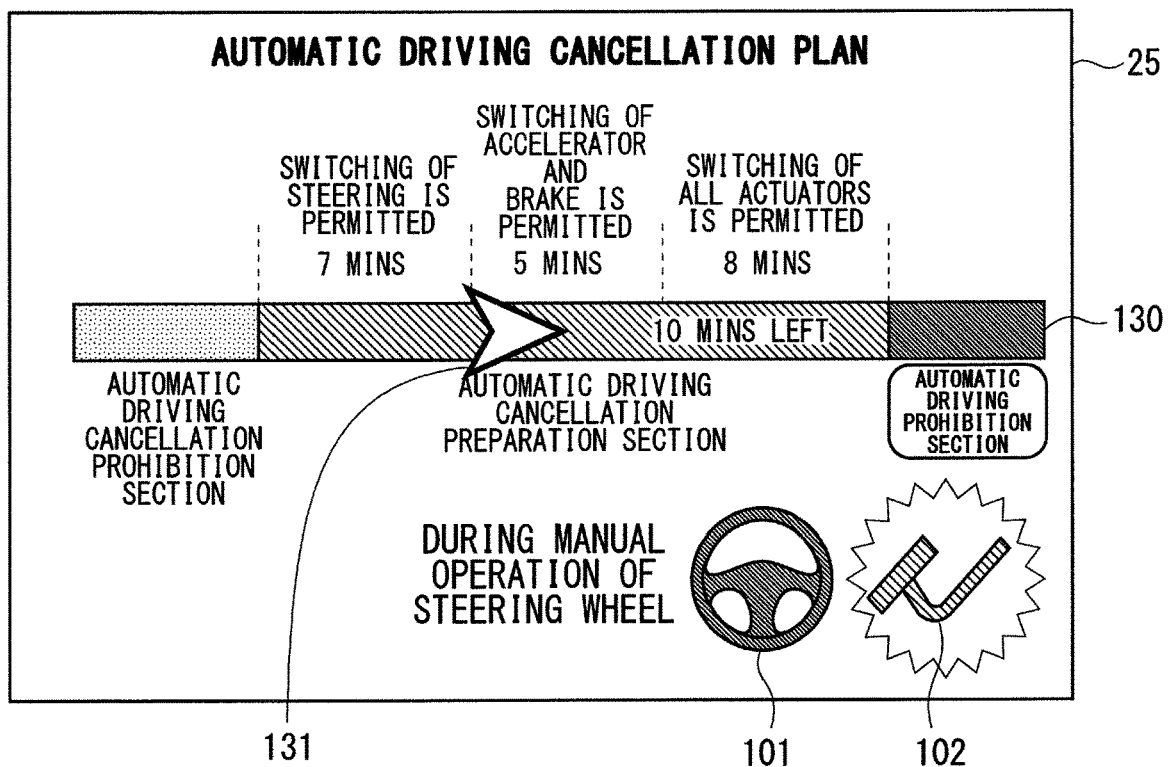
FIG. 12 is a view showing an exemplary image displayed on the display of the operation authority management apparatus in accordance with the second preferred embodiment.
Figure 13:
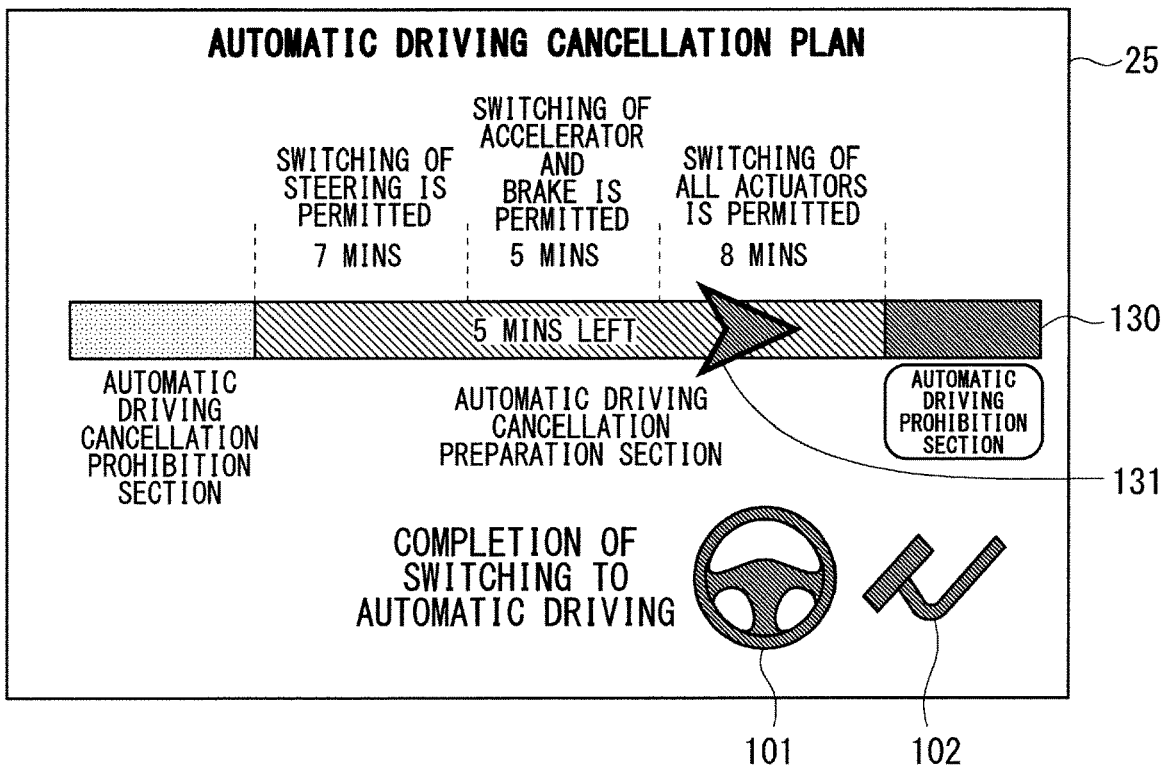
FIG. 13 is a view showing an exemplary image displayed on the display of the operation authority management apparatus in accordance with the second preferred embodiment.

In the state of FIG. 10, for example, since the subject vehicle is positioned in the automatic driving cancellation prohibition section, both the steering image 101 and the accelerator/brake image 102 are displayed in the first display mode (e.g., in gray color). When the subject vehicle enters the section where the manual operation of the steering 31 is permitted, the display mode of the steering image 101 is changed to the second display mode (e.g., of blink display in red and blue colors), as shown in FIG. 11. Further, when the subject vehicle enters the section where the manual operations of the accelerator 32 and the brake 33 are permitted, the display mode of the accelerator/brake image 102 is changed to the second display mode, as shown in FIG. 12. Then, when the driver switches the operations of the steering 31, the accelerator 32, and the brake 33 to the manual operations, the display modes of the steering image 101 and the accelerator/brake image 102 are changed to the third display mode (e.g., in blue color), as shown in FIG. 13. At that time, the display mode of the subject vehicle mark 131 may be changed.

Like in FIGS. 11 to 13, after the subject vehicle enters the automatic driving cancellation preparation section, displayed is a remaining time until the subject vehicle reaches a point where it is necessary to switch the operations of all the actuators to the manual operations, i.e., a starting point of the automatic driving prohibition section. The display of the remaining time until the subject vehicle reaches the starting point of the automatic driving prohibition section may be performed before the subject vehicle enters the automatic driving cancellation preparation section.

Figure 14:
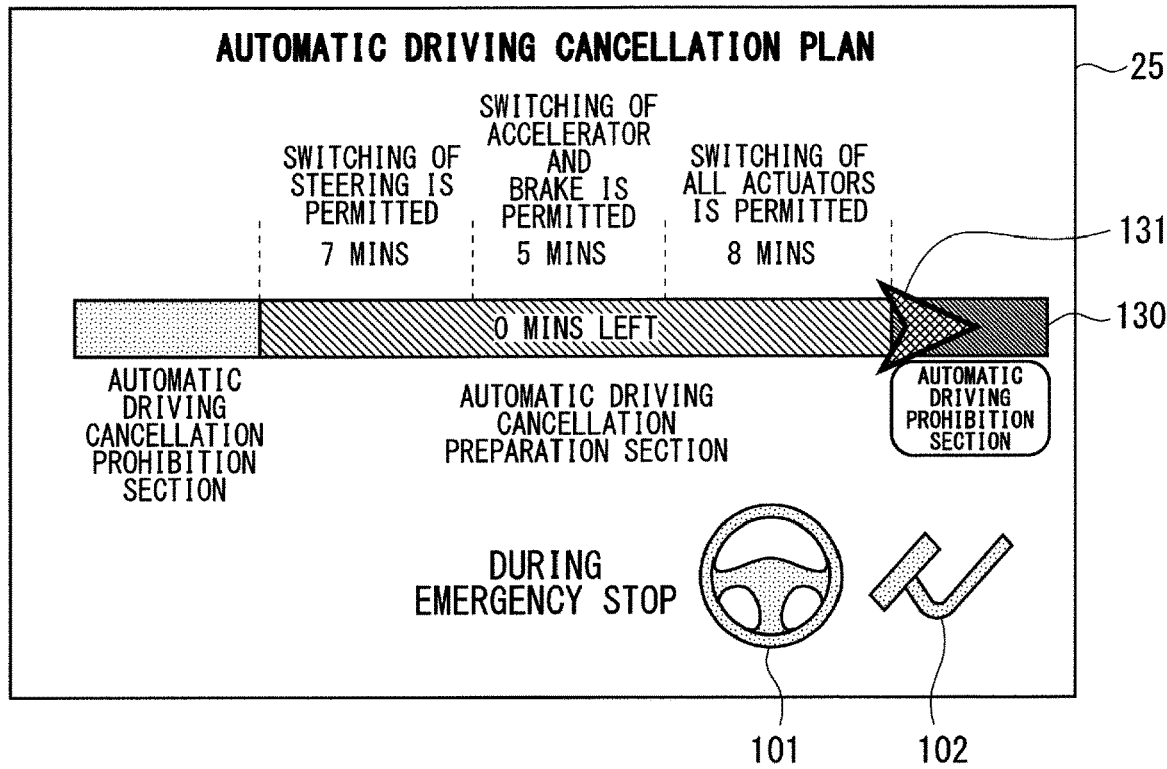
FIG. 14 is a view showing an exemplary image displayed on the display of the operation authority management apparatus in accordance with the second preferred embodiment.

FIG. 14 is a view showing an exemplary display in a case where the subject vehicle reaches the automatic driving prohibition section while the switching of the operations of all the actuators to the manual operations is not completed. In this case, since the automatic driving cannot continue, it is preferable that the operation authority management apparatus 10 controls the driving controller 20 to cause the subject vehicle to stop at an appropriate place (a place where the subject vehicle is not obstructive to the traffic). This operation is referred to as an "emergency stop operation". At this time, the display mode of the scale image 130 may be also changed, as shown in FIG. 14.

Figure 15:
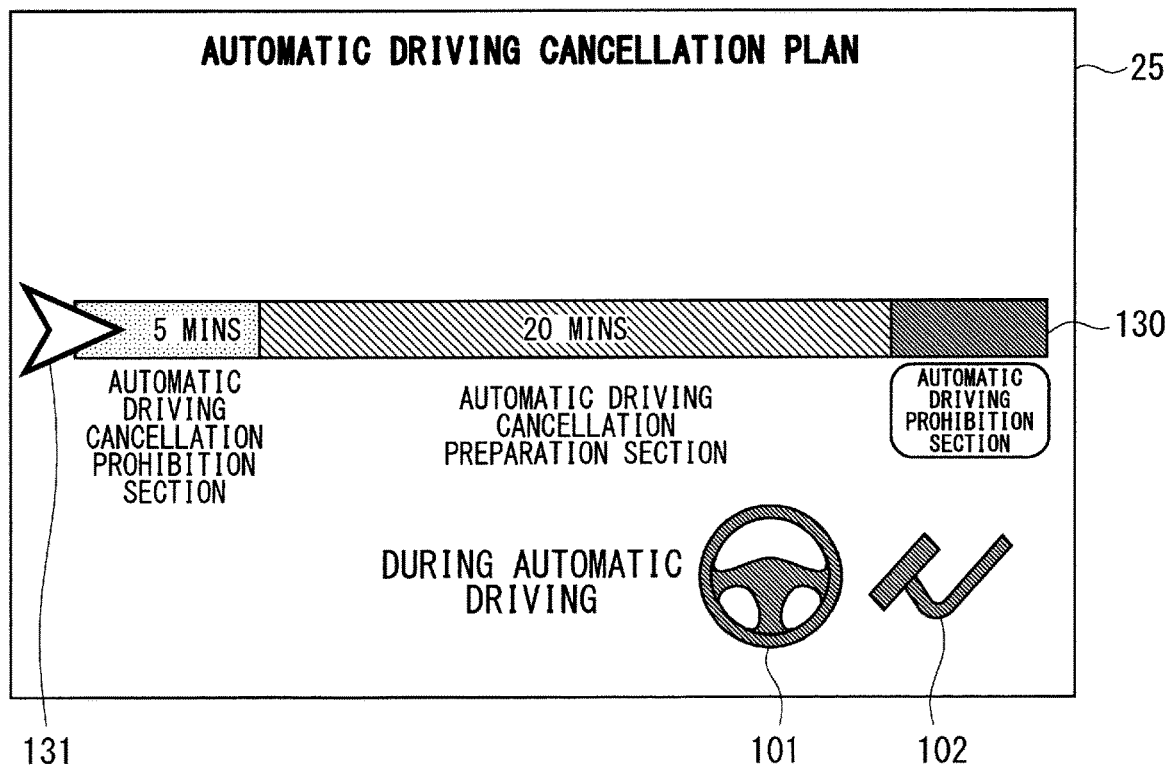
FIG. 15 is a view showing an exemplary image displayed on the display of the operation authority management apparatus in accordance with the second preferred embodiment.

Further, in FIGS. 12 to 14, though the information of the actuator which is permitted to switch to the manual operation is represented by characters in the automatic driving cancellation preparation section, the representation by the characters may be omitted as shown in FIG. 15 since the information is displayed in real time by using the steering image 101 and the accelerator/brake image 102. Furthermore, the notification unit 13 may display other information such as a name of current driving mode (for example, "automatic driving mode", "semi-automatic driving mode", "manual driving mode", or the like) on the display 25.

Figure 16:
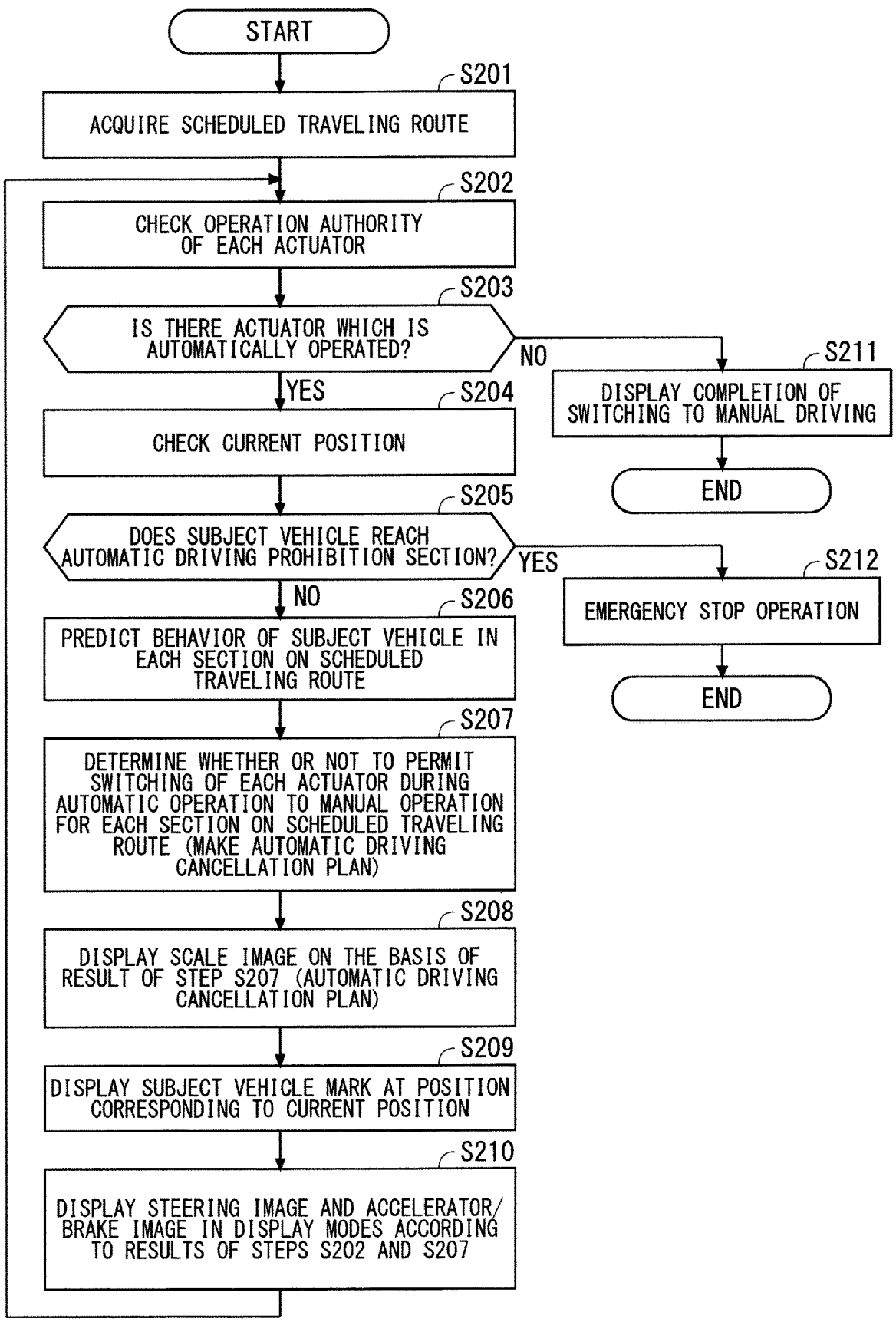
FIG. 16 is a flowchart showing an operation of the operation authority management apparatus in accordance with the second preferred embodiment.

FIG. 16 is a flowchart showing an operation of the operation authority management apparatus 10 in accordance with the second preferred embodiment. The above-described operation of the operation authority management apparatus 10 is executed when the operation authority management apparatus 10 performs the process steps shown in FIG. 16. Hereafter, the operation of the operation authority management apparatus 10 will be described with reference to FIG. 16.

After the operation authority management apparatus 10 starts the operation, first, the scheduled traveling route acquisition unit 14 acquires the information of the scheduled traveling route of the subject vehicle from the scheduled traveling route calculator 27 (Step S201). Subsequently, the determination unit 12 checks whether the driver or the determination unit 12 has the operation authority of each actuator (the steering 31, the accelerator 32, and the brake 33) (Step S202). In other words, the determination unit 12 checks which of the actuators is manually operated and which of the actuators is automatically operated.

When there is an actuator which is automatically operated ("YES" in Step S203), the determination unit 12 checks the current position of the subject vehicle (Step S204). If the subject vehicle has not reached the automatic driving prohibition section yet ("NO" in Step S205), the vehicle behavior prediction unit 11 predicts a behavior of the subject vehicle in each section (including the current position) on the scheduled traveling route on the basis of the scheduled traveling route acquired by the scheduled traveling route acquisition unit 14 and various information acquired from the map data storage 21, the peripheral information detector 22, the communication device 23, and the vehicle information acquisition device 24 (Step S206). Then, the determination unit 12 determines, for each individual actuator, whether or not to permit the switching of the actuator during the automatic operation to the manual operation for each section on the basis of the behavior of the subject vehicle predicted by the vehicle behavior prediction unit 11 (Step S207). Further, the determination unit 12 stores therein the determination results as the automatic driving cancellation plan 12a.

Next, the notification unit 13 displays the scale image 130 on the basis of the result of Step S207 (the automatic driving cancellation plan 12a) (Step S208). Specifically, as shown in FIG. 10, the automatic driving cancellation prohibition section, the automatic driving cancellation preparation section, and the automatic driving prohibition section are displayed in different display modes, respectively. Further, the subject vehicle mark 131 is displayed on the position on the scale image 130, corresponding to the current position of the subject vehicle (Step S209). Then, like in the first preferred embodiment, the steering image 101 and the accelerator/brake image 102 are displayed in the display modes according to the current state of each actuator found from the results of Steps S202 and S207 (Step S210).

Further, in Step S203, when there is no actuator which is automatically operated ("NO" in Step S203), the switching to the manual operation is completed for all the actuators. In this case, the notification unit 13 performs the display as shown in FIG. 13, to thereby notify the driver of completion of the switching to the manual operation (Step S211).

Furthermore, in Step S205, when it is determined that the subject vehicle reaches the automatic driving prohibition section ("YES" in Step S205), the operation authority management apparatus 10 controls the driving controller 20 to perform the emergency stop operation of the subject vehicle (Step S212), and the notification unit 13 preforms the display as shown in FIG. 14, to thereby notify the driver that the emergency stop operation of the subject vehicle has been performed.

According to the present preferred embodiment, since the driver can grasp the automatic driving cancellation preparation section in advance, the driver can cancel the automatic driving without being confused.

The images displayed on the display 25 by the notification unit 13 are not limited to those shown in FIGS. 10 to 15. With reference to FIGS. 17 to 22, other exemplary images to be displayed on the display 25 by the notification unit 13 will be described.

Figure 17:
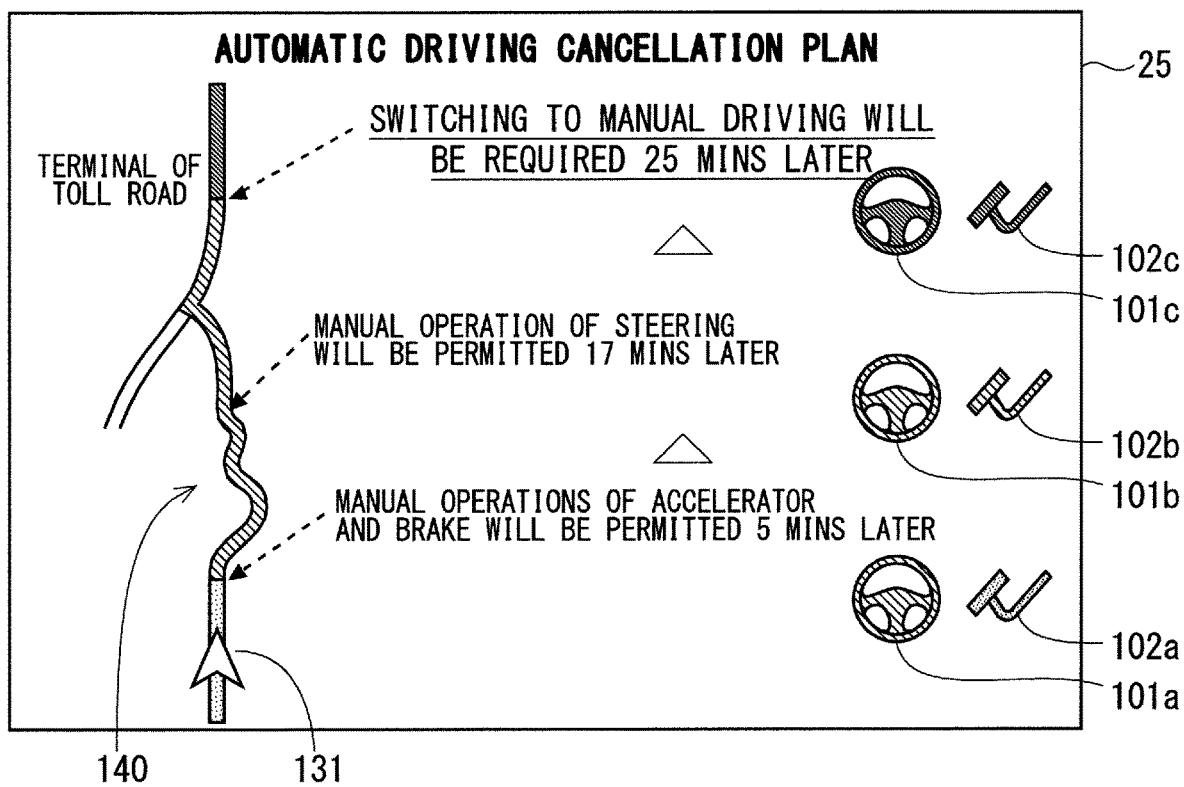
FIG. 17 is a view showing an exemplary image displayed on the display of the operation authority management apparatus in accordance with the second preferred embodiment.
Figure 18:
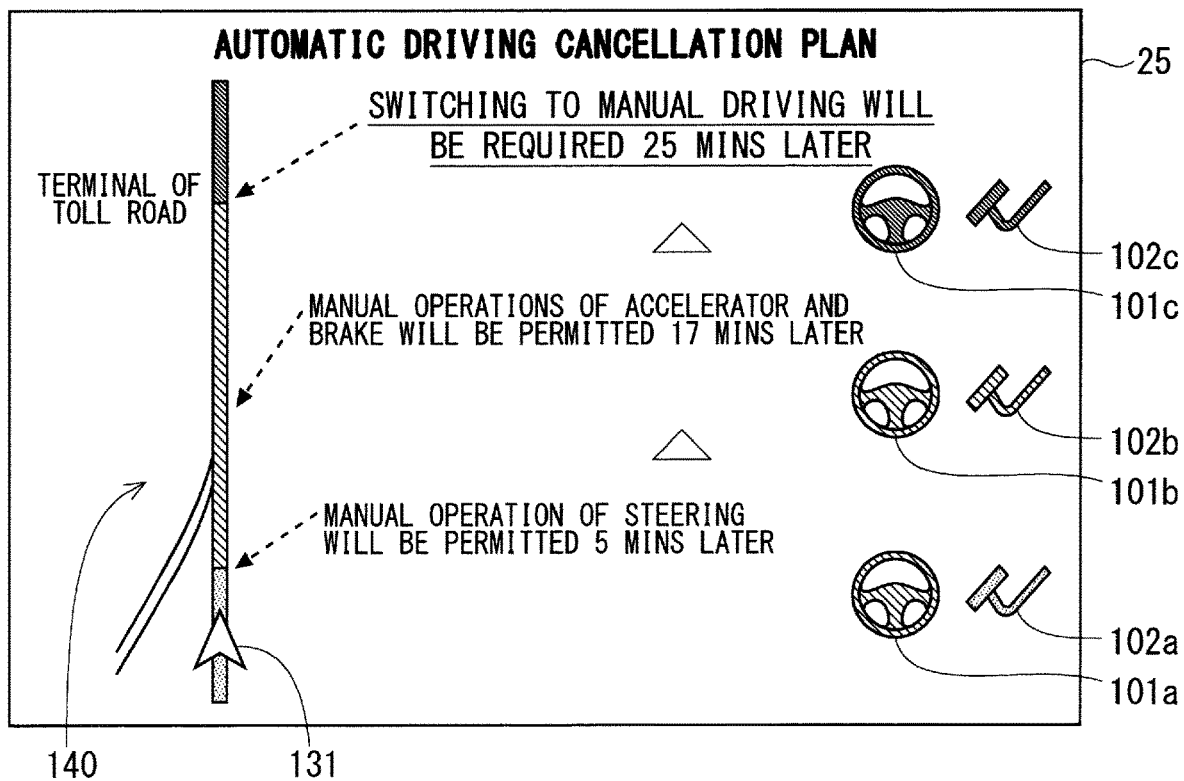
FIG. 18 is a view showing an exemplary image displayed on the display of the operation authority management apparatus in accordance with the second preferred embodiment.
Figure 19:
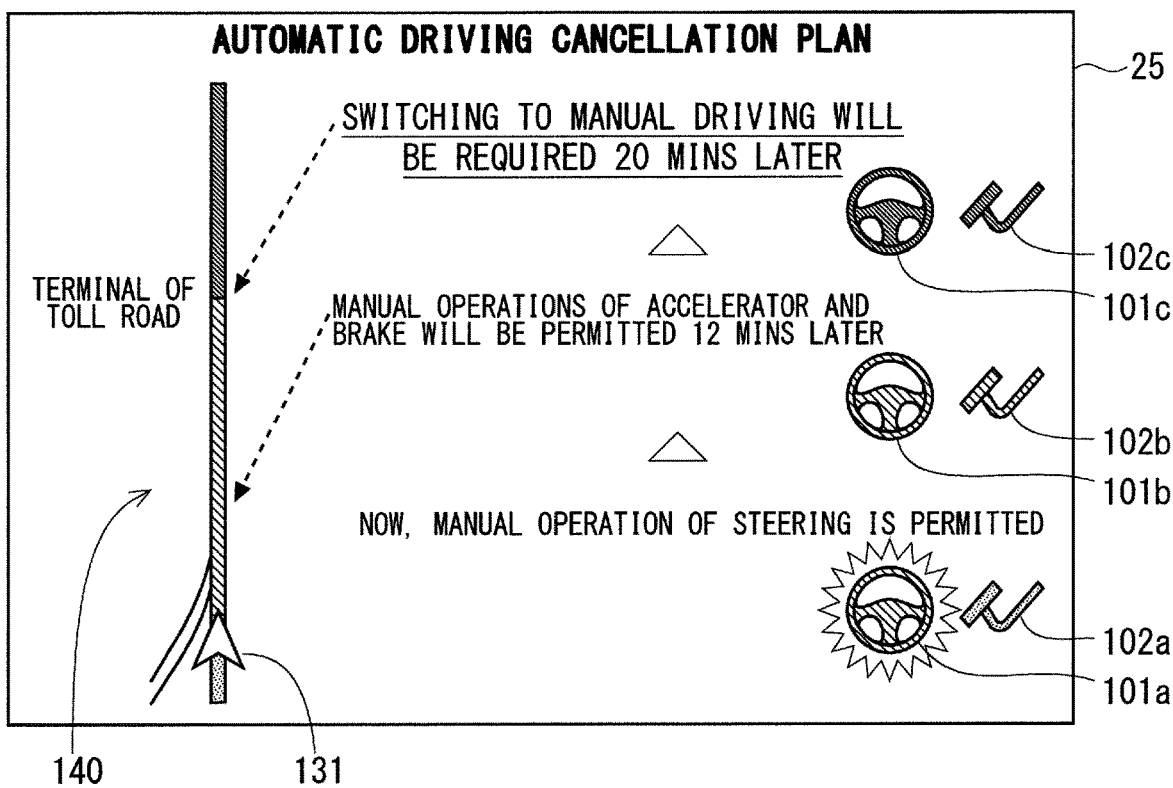
FIG. 19 is a view showing an exemplary image displayed on the display of the operation authority management apparatus in accordance with the second preferred embodiment.

For example, instead of the scale image 130 shown in FIGS. 10 to 15, a map image 140 representing an actual road shape may be displayed on the display 25, like in FIGS. 17 and 18. Further, instead of moving the subject vehicle mark 131, by scrolling the map image 140, the movement of the position of the subject vehicle may be represented. For example, FIG. 19 shows a state after five minutes from the state shown in FIG. 18.

Further, though the steering image 101 and the accelerator/brake image 102 shown in FIGS. 10 to 15 represent only the current state of the actuator, these images may be used to represent the content of the automatic driving cancellation plan 12a. For example, FIGS. 17 and 18 show a steering image 101a and an accelerator/brake image 102a which represent the state of the actuator in a period from the point in time after five minutes of traveling to the point in time after seventeen minutes of traveling, a steering image 101b and an accelerator/brake image 102b which represent the state of the actuator in a period from the point in time after seventeen minutes of traveling to the point in time after twenty-five minutes of traveling, and a steering image 101c and an accelerator/brake image 102c which represent the state of the actuator after twenty-five minutes of traveling. In this case, among the steering images 101a, 101b, and 101c and the accelerator/brake images 102a, 102b, and 102c, those corresponding to the current position of the subject vehicle may represent the current state of the actuator. For example, in FIG. 18, since the subject vehicle enters the section where the manual operation of the steering 31 is permitted, the display mode of the steering image 101a is changed to the second display mode (e.g., of blink display in red and blue colors).

Further, as to the automatic driving prohibition section, the reason for prohibiting the automatic driving may be indicated (the characters of "terminal of toll road" in FIG. 17 corresponds to the reason). Furthermore, it is preferable that the characters indicating that the switching to the manual driving is required in the automatic driving prohibition section are more outstanding than others. For this reason, in the exemplary cases of FIGS. 17 to 19, the characters of "switching to manual driving is required" is underlined.

Figure 20:
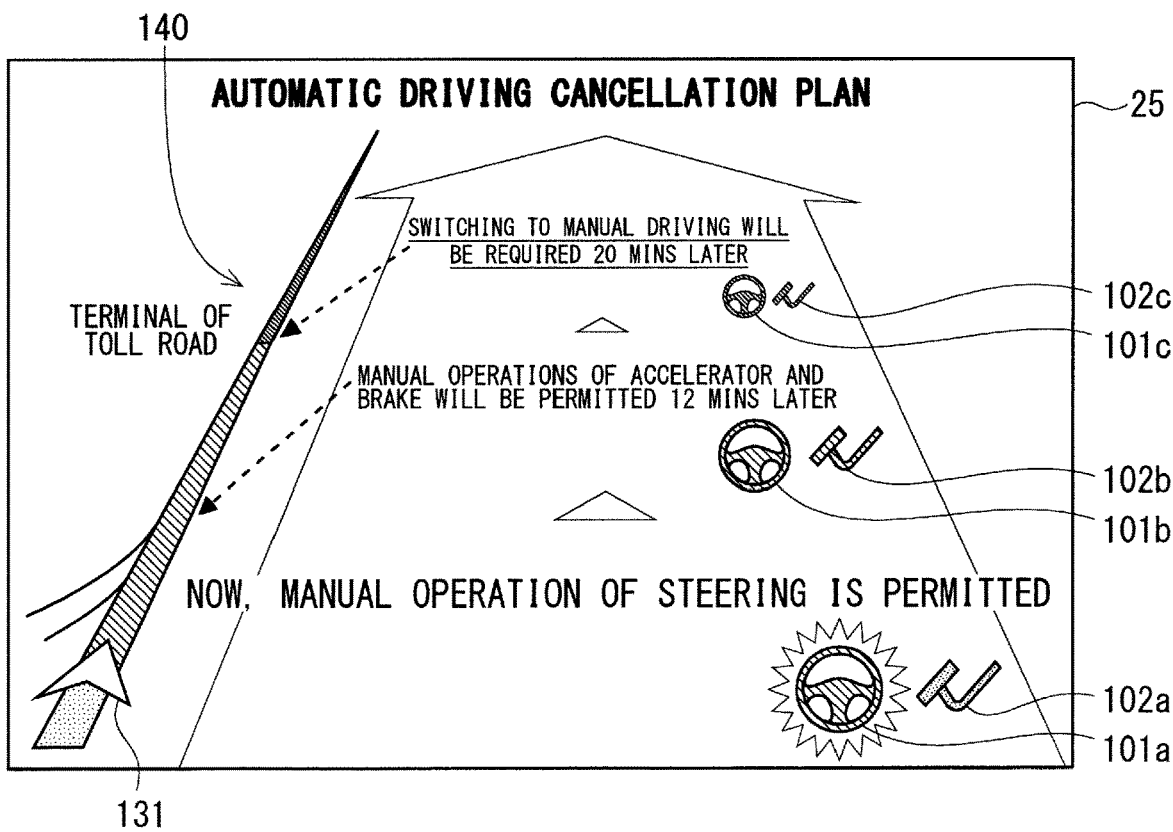
FIG. 20 is a view showing an exemplary image displayed on the display of the operation authority management apparatus in accordance with the second preferred embodiment.

Like in FIG. 20, the content of the automatic driving cancellation plan 12a may be represented by using an image in perspective and a distance from the current position of the subject vehicle to each section on the scheduled traveling route may be represented with an apparent depth. A planar image in perspective may be displayed on a general-type flat panel display and an image in actual perspective may be displayed by using a 3D display. Further, by using a HUD (Head Up Display) capable of setting an apparent distance (focal length) to a virtual image, an image in actual perspective may be displayed in a visual field of the driver.

In the exemplary cases of FIGS. 10 to 15, instead of the steering image 101 and the accelerator/brake image 102, an image in which the automatic steering image 111, the manual steering image 112, the automatic accelerator/brake image 121, and the manual accelerator/brake image 122 shown in FIGS. 7 and 8 are arranged in a matrix may be used.

Figure 21:
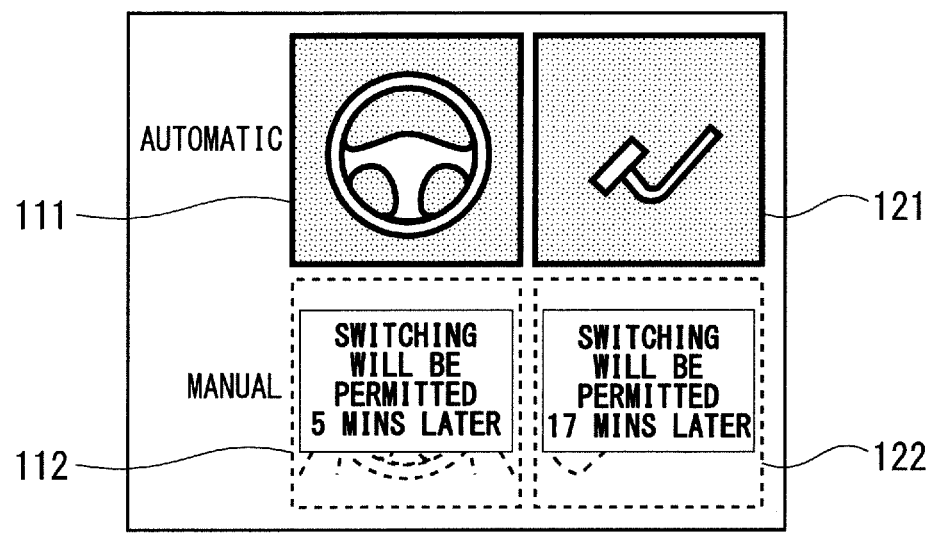
FIG. 21 is a view showing an exemplary image displayed on the display of the operation authority management apparatus in accordance with the second preferred embodiment.
Figure 22:
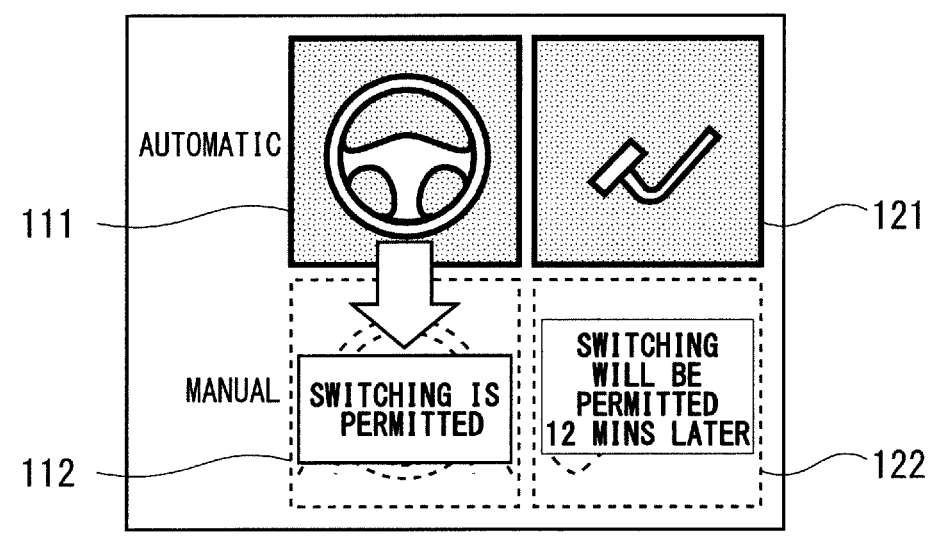
FIG. 22 is a view showing an exemplary image displayed on the display of the operation authority management apparatus in accordance with the second preferred embodiment.

Like in FIGS. 21 and 22, for example, if a display mode in which the characters representing the remaining time till the time when the switching to the manual operation is permitted are added is introduced as the display mode for the manual steering image 112 and the manual accelerator/brake image 122, the automatic driving cancellation plan 12a can be thereby represented. Further, FIG. 21 shows that the switching to the manual operation of the steering 31 is permitted five minutes later and the switching to the manual operations of the accelerator 32 and brake 33 is permitted seventeen minutes later. Furthermore, FIG. 22 shows a state after five minutes of traveling from the state of FIG. 21. It can be seen that the characters added to the manual steering image 112 are changed to "switching is permitted" and the remaining time represented by the manual accelerator/brake image 122 is reduced.

Though the length of each section on the scheduled traveling route is represented by time (traveling time of the subject vehicle) in the above description, the length may be represented by distance. Similarly, the remaining time until the subject vehicle reaches each section or a location may be also represented by using a distance from the subject vehicle.

In the present invention, the preferred embodiments may be freely combined, or may be changed or omitted as appropriate, without departing from the scope of the invention.

While the invention has been shown and described in detail, the foregoing description is in all aspects illustrative and not restrictive. It is therefore understood that numerous modifications and variations can be devised without departing from the scope of the invention.

EXPLANATION OF REFERENCE SIGNS 10 operation authority management apparatus, 11 vehicle behavior prediction unit, 12 determination unit, 12a automatic driving cancellation plan, 13 notification unit, 14 scheduled traveling route acquisition unit, 20 driving controller, 21 map data storage, 22 peripheral information detector, 23 communication device, 24 vehicle information acquisition device, 25 display, 26 audio output device, 27 scheduled traveling route calculator, 31 steering, 32 accelerator, 33 brake, 50 processing circuit, 51 processor, 52 memory, 101 steering image, 102 accelerator/brake image, 111 automatic steering image, 112 manual steering image, 121 automatic accelerator/brake image, 122 manual accelerator/brake image, 130 scale image, 131 subject vehicle mark, 140 map image

The invention claimed is:

1. An operation authority management apparatus to manage switching between automatic operation and manual operation of a plurality of actuators including a steering actuator, an accelerator actuator, and a brake actuator of a vehicle, the operation authority management apparatus comprising:
 a processor to execute a program; and
 a memory to store the program which, when executed by the processor, performs processes of,
 predicting a behavior of the vehicle;
 determining whether or not to permit switching of each actuator in the plurality of actuators during the automatic operation to the manual operation on the basis of the behavior of the vehicle which is predicted; and
 notifying a driver of the vehicle of a result of the determination for each actuator in the plurality of actuators, wherein
 the processor includes cases of:
 during an automatic driving in which all of the steering actuator, the accelerator actuator, and the brake actuator are automatically operated, permitting a manual operation of the steering actuator on the basis of the behavior of the vehicle while prohibiting a manual operation of the accelerator actuator and the brake actuator, thereby bringing the vehicle into a semi-automatic driving, and subsequently permitting the manual operation of the accelerator actuator and the brake actuator on the basis of the behavior of the vehicle, thereby bringing the vehicle into a manual driving; and during the automatic driving, permitting a manual operation of the accelerator actuator and the brake actuator while prohibiting a manual operation of the steering actuator on the basis of the behavior of the vehicle, thereby bringing the vehicle into a semi-automatic driving, and subsequently permitting the manual operation of the steering actuator on the basis of the behavior of the vehicle, thereby bringing the vehicle into a manual driving.

2. The operation authority management apparatus according to claim 1, wherein the processor determines an automatic driving cancellation preparation section where switching to a manual operations of either the steering actuator or the accelerator actuator and the brake actuator is permitted, and permits switching from an automatic operation of the steering actuator, the accelerator actuator, and the brake actuator to a manual operation after the vehicle enters the automatic driving cancellation preparation section before the vehicle enters an automatic driving cancellation prohibition section where the automatic driving and the semi-automatic driving of the vehicle are not permitted.

3. The operation authority management apparatus according to claim 1, wherein the processor does not permit switching from the automatic operation to the manual operation of the steering actuator in a section where it is predicted that the amount of variation in steering angle of the vehicle per unit time is larger than a predetermined threshold value, and the processor does not permit switching from the automatic operation to the manual operation of the accelerator actuator and the brake actuator in a section where it is predicted that the amount of variation in travel speed of the vehicle per unit time is larger than a predetermined threshold value.

4. The operation authority management apparatus according to claim 3, wherein the processor does not permit switching from the automatic operation to the manual operation of the steering actuator when the vehicle travels side by side with another vehicle, regardless of the behavior of the vehicle which is predicted.

5. The operation authority management apparatus according to claim 3, wherein the processor does not permit switching from the automatic operation to the manual operation of the accelerator actuator and the brake actuator when the vehicle travels on a sloping road, regardless of the behavior of the vehicle which is predicted.

6. The operation authority management apparatus according to claim 3, wherein the processor does not permit switching from the automatic operation to the manual operation of the accelerator actuator and the brake actuator when the vehicle travels on a congested road, regardless of the behavior of the vehicle which is predicted.

7. The operation authority management apparatus according to claim 3, wherein the processor does not permit switching from the automatic operation to the manual operation of the accelerator actuator and the brake actuator when a distance between the vehicle and a following vehicle is smaller than a predetermined threshold value, regardless of the behavior of the vehicle which is predicted.

8. The operation authority management apparatus according to claim 3, wherein the processor does not permit switching from the automatic operation to the manual operation of the accelerator actuator and the brake actuator when the vehicle travels following a preceding vehicle and the preceding vehicle accelerates or decelerates, regardless of the behavior of the vehicle which is predicted.

9. The operation authority management apparatus according to claim 1, wherein the processor predicts the behavior of the vehicle on the basis of a current position of the vehicle and map data.

10. The operation authority management apparatus according to claim 1, wherein the processor predicts the behavior of the vehicle on the basis of peripheral information of the vehicle acquired by a sensor of the vehicle.

11. The operation authority management apparatus according to claim 1, wherein the processor predicts the behavior of the vehicle on the basis of at least one of traffic information, disaster information, and weather information which are acquired through a communication device.

12. The operation authority management apparatus according to claim 1, wherein the processor further acquires information of a scheduled traveling route of the vehicle, predicts the behavior of the vehicle in each section on the scheduled traveling route, determines, for each section on the scheduled traveling route, whether or not to permit switching of the actuator during the automatic operation to the manual operation, and notifies the driver of a result of the determination for each section on the scheduled traveling route.

13. The operation authority management apparatus according to claim 12, wherein the processor further notifies the driver of a distance or time required to reach a point where the switching of the actuator during the automatic operation to the manual operation is required.

14. The operation authority management apparatus according to claim 12, wherein the processor displays the result of the determination result for each section on the scheduled traveling route together with an image representing a positional relation between the current position of the vehicle and the each section on the scheduled traveling route, on a display.

15. The operation authority management apparatus according to claim 14, wherein the image representing the positional relation between the current position of the vehicle and the each section on the scheduled traveling route is an image obtained by superimposing an image representing the current position of the vehicle on a figure linearly representing the each section on the scheduled traveling route or a map representing the scheduled traveling route.

16. The operation authority management apparatus according to claim 14, wherein the image representing the positional relation between the current position of the vehicle and the each section on the scheduled traveling route is an image which represents a distance from the current position of the vehicle to the each section on the scheduled traveling route by using an apparent depth.

17. The operation authority management apparatus according to claim 1, wherein
the processor displays a plurality of images corresponding to the plurality of actuators on a display and represents the result of the determination by using display modes of the plurality of images.

18. The operation authority management apparatus according to claim 1, wherein
the processor displays a plurality of automatic actuator images representing automatic operations of the plurality of actuators and a plurality of manual actuator images representing manual operations of the plurality of actuators, which are arranged side by side, on a display and represents the result of the determination by using display modes of the plurality of automatic actuator images and the plurality of manual actuator images.

19. The operation authority management apparatus according to claim 1, wherein
the processor further gives the driver a notification which suggests switching of the actuator which is permitted to switch from the automatic operation to the manual operation, to the manual operation.

20. An operation authority management method which manages switching between automatic operation and manual operation of a plurality of actuators including a steering actuator, an accelerator actuator, and a brake actuator of a vehicle, the operation authority management method comprising:

predicting a behavior of the vehicle;
determining whether or not to permit switching of each actuator in the plurality of actuators during the automatic operation to the manual operation on the basis of the behavior of the vehicle which is predicted; and
notifying a driver of the vehicle of a result of the determination for each actuator in the plurality of actuators, wherein
the determination has cases of:
during an automatic driving in which all of the steering actuator, the accelerator actuator, and the brake actuator are automatically operated, permitting a manual operation of the steering actuator on the basis of the behavior of the vehicle while prohibiting a manual operation of the accelerator actuator and the brake actuator, thereby bringing the vehicle into a semi-automatic driving, and subsequently permitting the manual operation of the accelerator actuator and the brake actuator on the basis of the behavior of the vehicle, thereby bringing the vehicle into a manual driving; and
during the automatic driving, permitting a manual operation of the accelerator actuator and the brake actuator while prohibiting a manual operation of the steering actuator on the basis of the behavior of the vehicle, thereby bringing the vehicle into a semi-automatic driving, and subsequently permitting the manual operation of the steering actuator on the basis of the behavior of the vehicle, thereby bringing the vehicle into a manual driving.

* * * * *